United States Patent [19]
Altman et al.

[11] Patent Number: 4,778,645
[45] Date of Patent: Oct. 18, 1988

[54] PRESSURIZED WATER REACTOR HAVING DISCONNECTABLE TWO-PIECE DRIVE ROD ASSEMBLIES, AND RELATED METHODS OF ASSEMBLY AND MAINTENANCE OPERATIONS

[75] Inventors: Denis J. Altman, Penn Township, Westmoreland County; Theo van de Venne, Murrysville, both of Pa.

[73] Assignee: Westinghouse Electric Corp., Pittsburgh, Pa.

[21] Appl. No.: 806,711

[22] Filed: Dec. 9, 1985

[51] Int. Cl.[4] .............................................. G21C 19/20
[52] U.S. Cl. .................................... 376/260; 376/233
[58] Field of Search .............. 376/260, 233, 353, 327, 376/333, 209, 264

[56] References Cited

U.S. PATENT DOCUMENTS

| | | | |
|---|---|---|---|
| 3,346,459 | 10/1967 | Prince et al. | 376/234 |
| 3,595,748 | 7/1971 | Frisch et al. | 376/349 |
| 3,625,816 | 12/1971 | Aleite et al. | 376/333 |
| 3,734,825 | 5/1973 | Schabert et al. | 376/224 |
| 4,110,157 | 8/1978 | Jabsen | 376/233 |
| 4,134,789 | 1/1979 | Aubert | 376/233 |
| 4,147,589 | 4/1979 | Roman et al. | 376/233 |
| 4,439,054 | 3/1984 | Veronesi | 376/233 |
| 4,481,164 | 11/1984 | Bollinger | 376/260 |
| 4,544,521 | 10/1985 | Millot et al. | 376/228 |
| 4,681,728 | 7/1987 | Veronesi et al. | 376/209 |
| 4,696,786 | 9/1987 | Frizot et al. | 376/260 |
| 4,716,013 | 12/1987 | Veronesi et al. | 376/353 |

*Primary Examiner*—Deborah L. Kyle
*Assistant Examiner*—Daniel Wasil
*Attorney, Agent, or Firm*—D. C. Abeles

[57] ABSTRACT

Selectively and remotely disconnectable two-piece drive rod assemblies comprising elongated hub and drive rod portions interconnected by a selectively disconnectable coupling, connect rod clusters within the pressure vessel of a pressurized water reactor system to respectively corresponding drive means. The drive means are selectively operable, through the drive rod assemblies, to move the corresponding rod clusters between fully inserted positions within the lower barrel assembly of the pressure vessel, in telescoping relationship with fuel rod assemblies therein, and to a fully withdrawn position within an inner barrel assembly of the pressure vessel. The rods of each cluster are mounted to and supported by a respectively corresponding spider, in turn connected to the hub portion, the spider supporting the respective cluster on a support plate defining the lower elevation of the inner barrel assembly, in fully inserted positions of the corresponding rod clusters, and support the hubs in parallel axial relationship within the inner barrel assembly. The drive rod portions extend through the calandria and engage the couplings of the corresponding hub portions. The couplings are selectively disconnectable and, when disconnected, permit movement en masse of the calandria and drive rod portions during disassembly and assembly operations. Noninterchangeable couplings of first and second types corresponding to first and second types of rod clusters assure that incorrect couplings are not made in the assembly operations.

26 Claims, 20 Drawing Sheets

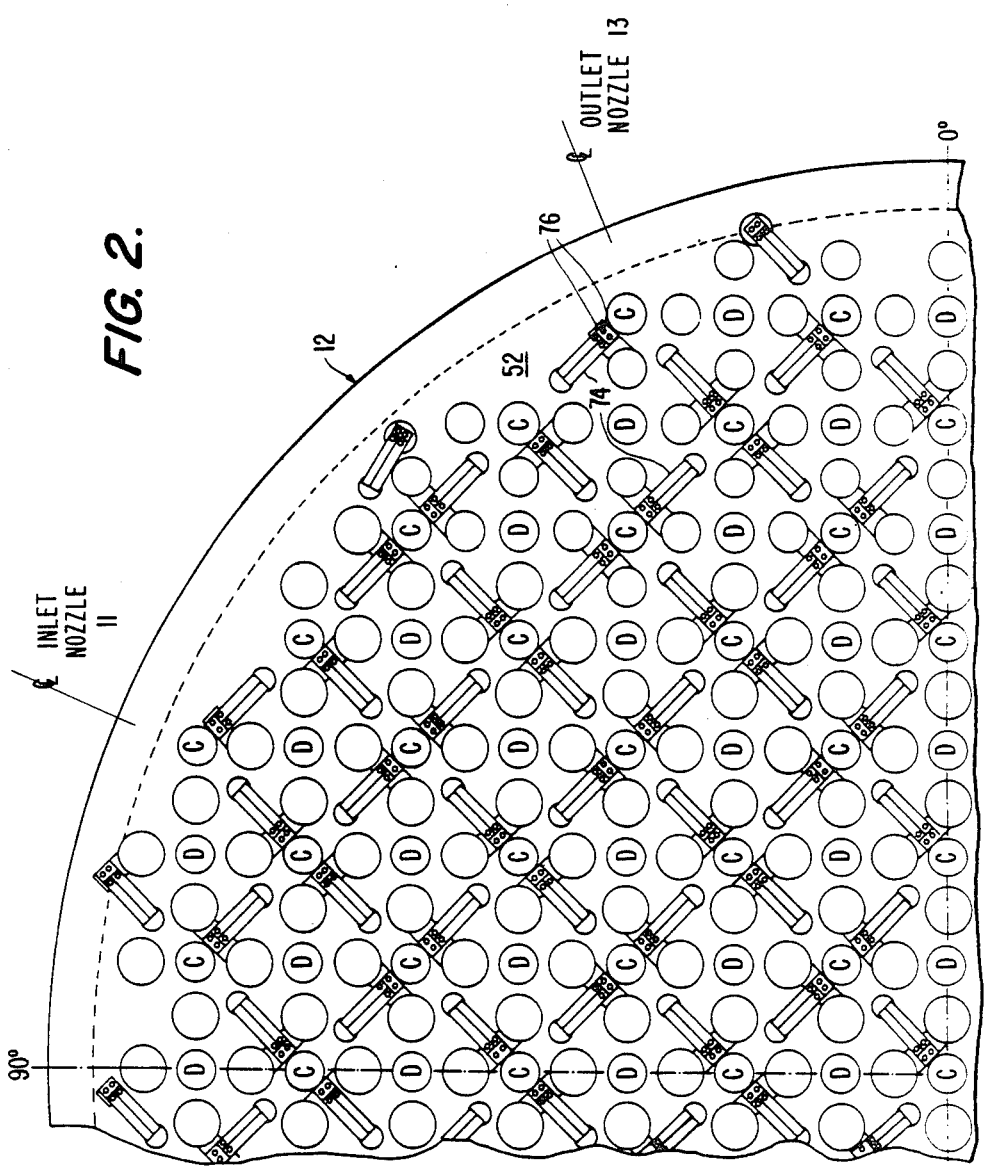

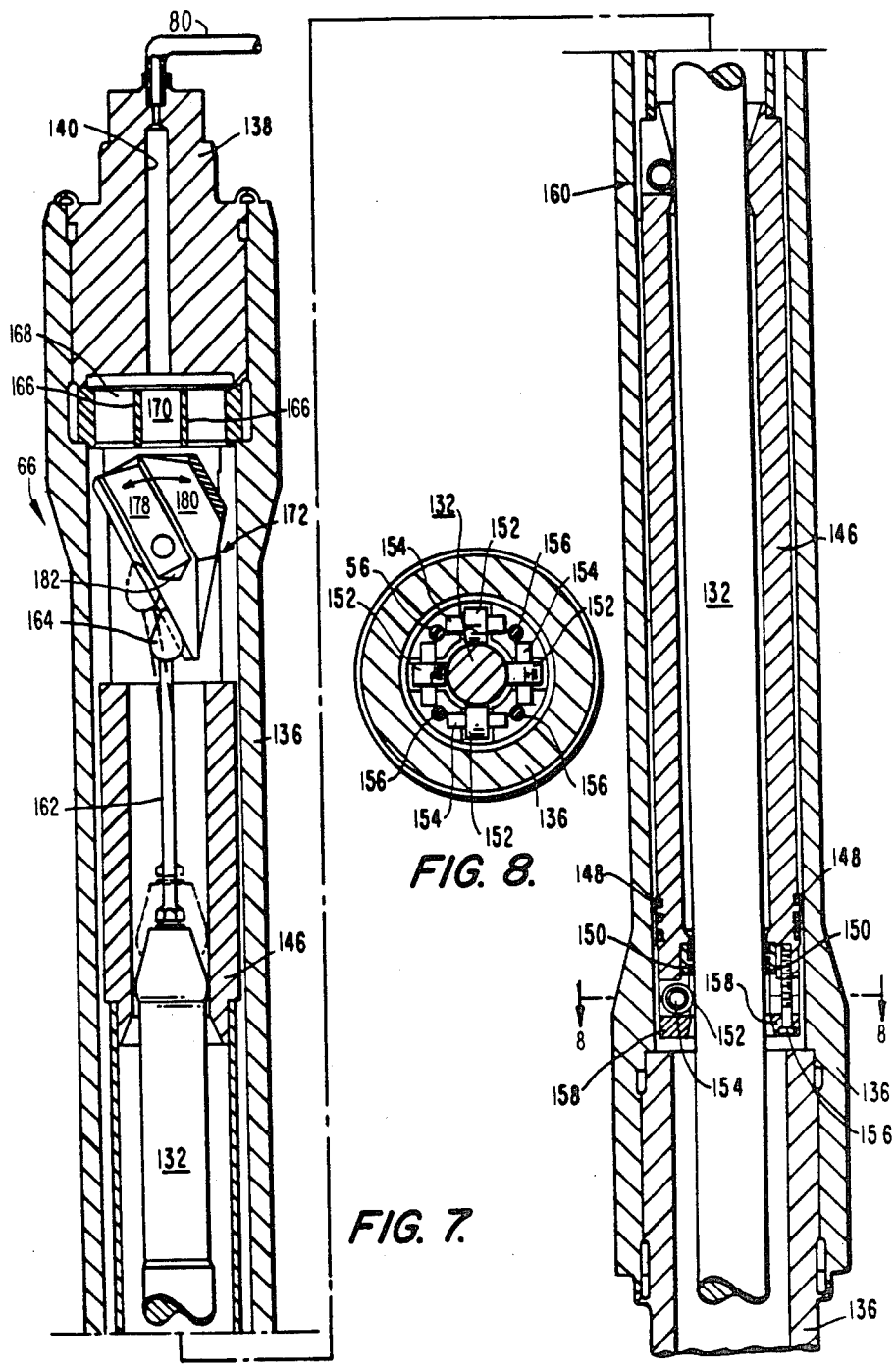

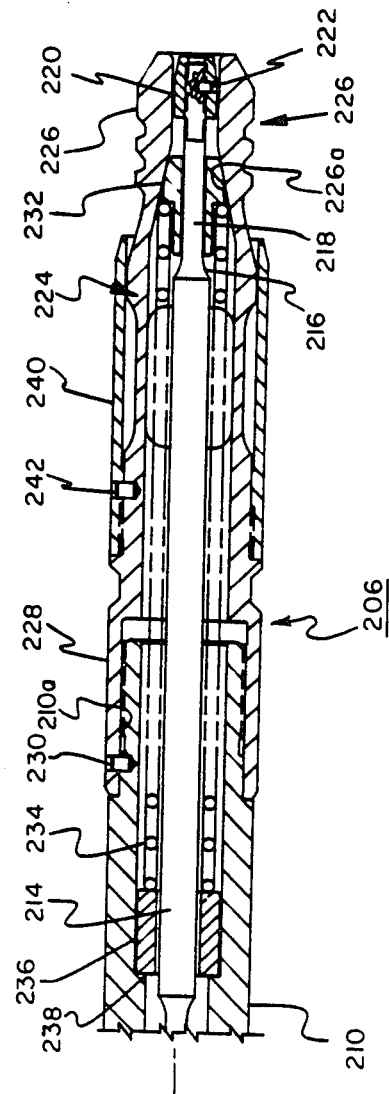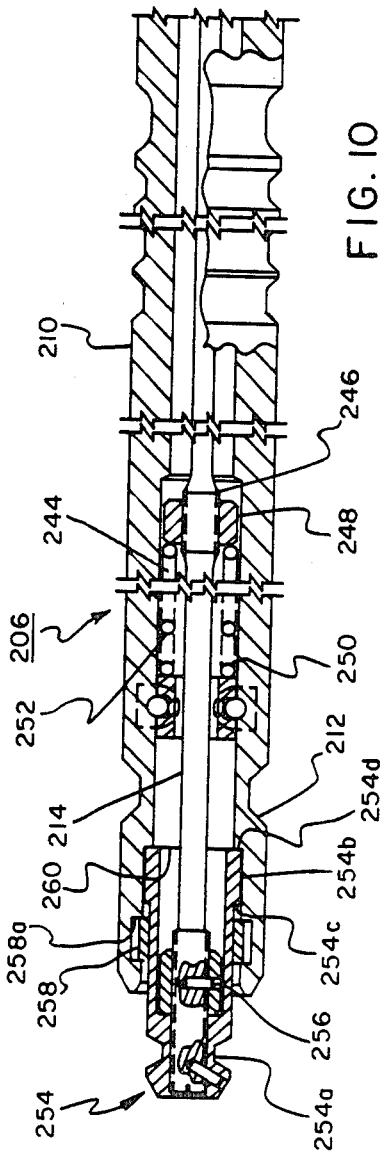
FIG. 10

PRESSURIZED WATER REACTOR HAVING DISCONNECTABLE TWO-PIECE DRIVE ROD ASSEMBLIES, AND RELATED METHODS OF ASSEMBLY AND MAINTENANCE OPERATIONS

BACKGROUND OF THE INVENTION

1. Field of the Invention

This invention relates to a pressurized water reactor system of an advanced design incorporating two-piece drive rods assemblies having selectively and remotely actuable, quick-disconnect couplings, and to methods of performing assembly/disassembly and related maintenance operations on such a reactor.

2. State of the Relevant Art

As is well known in the art, conventional pressurized water reactors employ a number of control rods which are mounted within the reactor vessel, generally in parallel axial relationship, for axial translational movement in telescoping relationship with the fuel rod assemblies. The control rods contain materials known as poisons, which absorb neutrons and thereby lower the neutron flux level within the core. Adjusting the positions of the control rods relative to the respectively associated fuel rod assemblies thereby controls and regulates the reactivity and correspondingly the power output level of the reactor.

Typically, the control rods, or rodlets, are arranged in clusters, and the rods of each cluster are mounted to a common, respectively associated spider. Each spider, in turn, is connected by corresponding drive rods to a respectively associated adjustment mechanism for raising or lowering the associated rod cluster.

In certain advanced designs of such pressurized water reactors, there are employed both reactor control rod clusters (RCC) and water displacer rod clusters (WDRC). In one such reactor design, a total of over 2800 reactor control rods and water displacer rods are arranged in 185 clusters, each of the rod clusters being mounted to a respectively corresponding spider. In the exemplary such advanced design pressurized water reactor, there are provided, at successively higher, axially aligned elevations within the reactor pressure vessel, a lower barrel assembly, an inner barrel assembly, and a calandria, each of generally cylindrical configuration, and an upper closure dome, or head. The lower barrel assembly may be conventional, having mounted therein, in parallel axial relationship, a plurality of fuel rod assemblies which are supported at the lower and upper ends thereof, respectively, by corresponding lower and upper core plates. Within the inner barrel assembly there is provided a large number of rod guides disposed in closely spaced relationship, in an array extending substantially throughout the cross-sectional area of the inner barrel assembly. The rod guides are of first and second types, respectively housing therewithin reactor control rod clusters (RCC) and water displacer rod clusters (WDRC); these clusters, as received in telescoping relationship within their respectively associated guides, generally are aligned with respectively associated fuel rod assemblies.

One of the main objectives of the advanced design, pressurized water reactors to which the present invention is directed, is to achieve a significant improvement in the fuel utilization efficiency, resulting in lower, overall fuel costs. Consistent with this objective, the water displacement rodlet clusters (WDRC's) function as a mechanical moderator control, all of the WDRC's being fully inserted into association with the fuel rod assemblies, and thus into the reactor core, when initiating a new fuel cycle. Typically, a fuel cycle is of approximately 18 months, following which the fuel must be replaced. As the excess reactivity level diminishes over the cycle, the WDRC's are progressively, in groups, withdrawn from the core so as to enable the reactor to maintain the same reactivity level, even through the reactivity level of the fuel rod assemblies is reducing due to dissipation over time. Conversely, the control rod clusters are moved, again in axial translation and thus telescoping relationship relatively to the respectively associated fuel rod assemblies, for control of the reactivity and correspondingly the power output level of the reactor on a continuing basis, for example in response to load demands, in a manner analogous to conventional reactor control operations.

The calandria includes a lower calandria plate and an upper calandria plate. The rod guides are secured in position at the lower and upper ends thereof, respectively, to the upper core plate and the lower calandria plate. Within the calandria and extending between the lower and upper plates thereof is mounted a plurality of calandria tubes in parallel axial relationship, respectively aligned with the rod guides. Flow holes are provided in remaining portions of the calandria plates, intermediates the calandria tubes, through which passes the reactor core outlet flow as it exits from its upward passage through the inner barrel assembly. The core outlet flow, or a major portion thereof, turns from the axial flow direction to a radial direction for passage through radially outwardly oriented outlet nozzles which are in fluid communication with the calandria.

In similar, parallel axial and aligned relationship, the calandria tubes are joined to corresponding flow shrouds which extend to a predetermined elevation within the head, and which in turn are connected to corresponding head extensions which pass through the structural wall of the head and carry, on their free ends at the exterior of and vertically above the head, corresponding adjustment mechanisms, as above noted. The adjustment mechanisms have corresponding control shafts, or drive rods, which extend through the respective head extensions, flow shrouds, and calandria tubes and are connected to the respectively associated spiders mounting the clusters of RCC rods and WDRC rods, and serve to adjust their elevational positions within the inner barrel assembly and, corrspondingly, the level to which the rods are lowered into the lower barrel assembly and thus into association with the fuel rod assemblies therein, thereby to control the activity within the core.

In the exemplary, advanced design pressurized water reactor, over 2,800 rods are mounted in 185 clusters, the latter being received within the corresponding 185 rod guides. Of these clusters, 88 are of the WDRC type, divided into 22 groups of four clusters each, the clusters of each group being chosen such that withdrawal of an individual group, or multiple such groups, maintains a symmetrical power distribution within the reactor core. Since each WDRC is approximately 700 lbs. to 800 lbs. in weight, each group of four (4) such clusters presents a combined weight of in the range of from 2,800 lbs. to 3,200 lbs., requiring that a drive mechanism and associated connecting structure for each group of four clusters have substantial strength and durability, and afford a substantial driving force.

Due to the packing density, or close spacing, of the rod clusters and their associated guides, severe spacing requirements are imposed, both within the vessel and with respect to the rod drive mechanisms, including both the water displacer rod drive mechanisms (DRDM's) and the control rod drive mechanism (CRDM's). The critical spacing requirements were not experienced in reactors of prior, conventional types, which did not employ WDRC's and correspondingly did not employ DRDM's. In reactors of such conventional designs, ample spacing was available above the dome, or head, of the vessel for accommodating the required number of mechanisms for driving the RCC's. Particularly, the CRDM's of well known, electromechanical type associated with corresponding clusters of RCC's, were mounted in generally parallel axial relationship, vertically above the dome or head of the vessel and extended in sealed relationship through the head for connection by suitable drive rods to the associated RCC's, and provided for selectively controlled gradual raising and lowering of the RCC's for moderating the reactor energy level, or for rapidly lowering same in the case of shutdown requirements.

In reactor systems of the advanced design herein contemplated, whereas the same mechanisms conventionally employed for the CRDM's functionally are acceptable for adjusting the WDRC's, due to the increased number of rod clusters (i.e., the total of RCC's and WDRC's s), the conventional CRDM's are unacceptable mechanically since they are too large. Various alternative mechanisms have been studied in view of this problem. For example, roller nut-drives were considered, but were determined to produce insufficient lifting force. Accordingly, a substitute DRDM has been developed which utilizes a hydraulically operated piston which is attached through a corresponding drive rod to each group of associated WDRC's, and which mechanism satisfies the spacing limitations, permitting mounting thereof above the head or dome of the vessel in conjunction with the conventional CRDM's. An example of such a hydraulically operated drive mechanism for a WDRC is shown in U.S. Pat. No. 4,439,054—Veronesi, issued Mar. 27, 1984 and assigned to the common assignee hereof.

A further critical design criterion of such reactors is to minimize vibration of the reactor internals structures, as may be induced by the core outlet flow as it passes through the reactor internal structures. A significant factor for achieving that criterion is to maintain the core outlet flow in an axial direction throughout the inner barrel assembly and thus in parallel axial relationship relatively to the rod clusters and associated rod guides. This is achieved, in part, by the location of the water inlet and outlet nozzles at an elevation corresponding approximately to that of the calandria assembly, and thus above the inner barrel assembly which housed the rod guides and associated rod clusters, as above noted.

The configuration of pressurized water reactors of the above described, advanced design has resulted in the requirement of increasing the axial height, or length, of the reactor pressure vessel, compared to that of conventional such reactors. The increased vessel height concomitantly imposes the requirement that the drive rods be on the order of 34' in length, compared to the 24' typical length of drive rods employed in conventional reactor vessels. This increase in the drive rod length poses many problems. At the outset, producing drive rods in a length of 34' or more is extremely expensive, and structures of this size introduce not only special manufacturing problems but as well problems of handling and shipping, including significant expense therefor, compounding the total cost factor. Further, whereas a one-piece drive rod could be produced by welding together, or using a mechanical joint to connect, plural, shorter components, the material employed in the drive rods, e.g., type 403 stainless steel, imposes costly preheat and postheat operations for welding, whereas mechanical joints require expensive buttering operations to permit tack welding of locking pins thereto for completing the mechanical assemblage. Performing either welding or mechanical assemblage operations in the field is impractical, and forming one-piece drive rods in this manner at a factory for subsequent transportation to the field site imposes the same problems as before noted.

Aside from the basic problems of fabrication, handling and transportation of one-piece drive rods sufficient in length to satisfy the requirements of pressurized water reactors of the advanced design, numerous other problems are presented thereby. Mechanically, such one-piece drive rods are difficult to manipulate, both in the assembly of a reactor incorporating same and in performing periodic maintenance operations. For example, alignment and assembly of the drive rods with the corresponding rod clusters is made extremely difficult by the increased length, introducing risks of damaging interior structures, such as the rod guides within the upper barrel assembly. At a minimum, structural damage by way of dents or other deformation of the rod guides cannot be tolerated in view of the potentially critical adverse flow characteristics and related vibration conditions which might result. Any such damage, of course, ultimately presents a problem of potential failure, over time. Further, distortions of rod guides may impeded the required, free axial movement of the rod guides of the associated clusters which, at a minimum level, would increase the rate of wear and, at a more extreme level, could prevent the smooth, axial/transational movement of the rod guides and associated clusters as is required for their intended control purposes, as above discussed.

In addition to the mechanically related problems and high cost factors created by and related to the excessively long drive rod structures required in such advanced design, pressurized water reactors as here considered, other critical problems as well are presented. For example, to perform routine maintenance operations, whether for inspection and/or replacement of parts, including rearrangement and/or replacement of partially used or spent fuel rod assemblies, the vessel must be disassembled, or dismantled. Typically, the head assembly first is removed and the drive rods removed, following which the various internals of the vessel are withdrawn, usually in successive stages or operations, thereby to gain access to the rod clusters and finally to the fuel rod assemblies. In some systems, the rod clusters must remain inserted into the fuel rod assemblies during refueling operations.

Due to the required length of the drive rods in the advanced design reactor vessels, these required maintenance functions present additional problems if drive rods of the required length of conventional one-piece construction were employed, and conventional methods were followed. Since the drive rods are immersed in the reactor coolant fluid, they are exposed to radioactivity within the vessel. Thus, after being withdrawn to permit disassembly of the vessel, and particularly in subsequent, reassembly operations, the rods would be exposed to the atmosphere above the boron-enriched water and thus prevent the serious and unacceptable risks of exposing maintenance personnel to undesired levels of radioactivity. The alternative of enlarging the containment structures to permit increasing the level of boron-enriched water, such that the excessively long drive rods remain immersed at all times, imposes an unacceptable increase in cost of the containment structure and of maintenance operations, in view of the required substantial increase in volume of boron-enriched water necessary for filling same to the required level to maintain the longer drive rods submerged. Even if the cost factors relevant to providing a sufficient depth of boron-enriched water were acceptable, the increased depth would present concomitantly increased difficulties in the reassembly operations, because the exceedingly long drive rods would have to be controlled in alignment though even a greater depth of water for reconnection, or recoupling, to the respectively corresponding rod clusters.

Accordingly, the increased vertical height, or longitudinal size, of the pressure vessels reuired by pressurized water reactors of the advanced design herein contemplated introduce problems, particularly relating to the drive rod structures, not encountered heretofor with reactor systems of conventional designs. Accordingly, there are no known solutions available, arising out of the prior art of conventional style reactors, for solving the complex problems addressed by the present invention.

SUMMARY OF THE INVENTION

The present invention relates to pressurized water reactors of an advanced design type which requires a substantial increase in the vertical height, or size, of the vessel and, more particularly, to selectively and remotely disconnectable two-piece drive rod assemblies for use in such vessels, and to methods of assembly and disassemby of such vessels made possible through the provision of such drive rod assemblies. A pressurized water nuclear reactor of the advanced design type here contemplated employs a large number of reactor control rods, or rodlets, typically arranged in what are termed reactor control rod clusters (RCC) and, additionally, a large number of water displacer rods, or rodlets, similarly arranged in water displacer rod clusters (WDRC), an array of 185 such clusters containing a total of 2800 rodlets (i.e., the total of reactor control rods and water displacer rods) being mounted in parallel axial relationship within the inner barrel assembly of the reactor pressure vessel. The rods of each cluster are connected at their upper ends to a corresponding spider, the rods being secured by support mounts connected through corresponding vane assemblies to a control hub of the spider. The spider-mounted cluster is received in telescoping relationship within a corresponding rod guide. Each spider is connected at its hub through a drive rod to a corresponding adjustment mechanism, which provides for selectively raising or lowering the rod cluster relatively to an associated group of fuel rod assemblies.

Each spider, and thus its associated vane assemblies, must be of considerable structural strength and weight. A typical water displacer rod (WDRC) cluster may comprise up to 24 water displacer rods mounted in alternating groups of two and four rods on corresponding ones of a total of eight vane assemblies, each of the four-rod assemblies including both a radially extending vane element and a pair of transversely extending vane elements, the latter carrying the cylindrical support mounts at their outer extremeties. As before noted, the total weight of a water displacer rod cluster, thus configured, is approximately 700 lbs. to 800 lbs. The spiders must support not only the dead weight of the respective rod clusters, but additionally must accommodate the forces imposed thereon both by the environment of the relatively fast-moving core outlet flow which passes thereover and the rod height adjustment functions.

The adjustment mechanisms for the rod clusters are mounted in generally prallel axial relationship on the head assembly, or dome, of the pressure vessel. The control rod cluster drive mechanisms (CRDM's) may be a conventional type as employed in the prior art, comprising electromechanically actuated mechanisms which provide for selectively raising and lowering the RCC's to provide the desired level of reactivity within the core and, alternatively, to lower the control rods rapidly in the event of a requirement for rapid shutdown.

Whereas typically the RCC's are moved as individual clusters by the above-noted conventional CRDM's in the exemplary, advanced design vessel, the WDRC's, are divided into 22 groups of four clusters each, the WDRC's of each group being selected such that withdrawal of a given one or more of the WDRC groups maintains a symmetrical power distribution within the reactor core. The drive mechanisms (DRDM's) for the water displacer rod clusters (WDRC's) may be of the type shown in the above referenced U.S. Pat. No. 4,439,054, which are driven hydraulically, and include a latch mechanism which mechanically latches the DRDM rods at a fixed position adjacent the upper end of the stroke. The hydraulic mechanisms of the patented type are compatible in physical size with the CRDM's, and thus may be accommodated within the available spacings on the vessel head assembly. A vent system and preferred method of driving the WDRM's are disclosed in the concurrently filed application, entitled "VENT SYSTEM FOR DISPLACER ROD DRIVE MECHANISM OF PRESSURIZED WATER REACTOR AND METHOD OF OPERATION," having common coinventors herewith and assigned to the common assignee.

The method of the present invention and the two-piece drive rod assemblies of the invention, as are incorporated in the advanced design pressure vessel and which enable practice of the method of the invention, overcome significant structural, materials, and handling problems of prior art designs and afford additional benefits of minimizing the potential of exposure of maintenance personnel to radiation and other fuel handling concerns. Particularly, the drive rod assemblies which connect the respective RCC's and WDRC's to the respective DRDM's and CRDM's are each formed of two, upper and lower portions, or components; the lower portion, synonymously termed a hub extension, is connected to the hub of the rod cluster spider by a semipermanent joint, and the upper portion, referred to synonymously as the drive rod portion, is connected to the hub extension by a selectively and remotely actuable, quick-disconnect coupling which may be similar to current coupling designs. Each of the individual components of the two-piece drive rod assemblies may be smaller than existing, conventional single piece, or unitary, drive rods. Thus, the selectivity disconnectable components of the drive rod assemblies of the present invention avoid the serious problems presented if a single piece drive rod of the unwiedly size, as above explained, were employed.

Significantly, the mating components of the selectively and remotely actuable quick-disconnect couplings of the respective WDRC and DRDM drive rod assemblies are compatible in structure and operation, yet configured different so as to be noninterchangeable, thereby assuring that incorrect couplings do not occur. This is a matter of critical concern, in light not only of structural damage, but also of the potentially more serious operating deficiencies which predictably would result, if incorrect couplings were made in the assembly operations.

By properly proportioning the components of the respective CRDM and DRDM disconnectable drive rod assemblies, taking into account certain significant design features of reactor vessels of the advanced design type here considered, and in accordance with the method of the present invention, highly efficient assembly/disassembly operations may be performed. Those assembly/disassembly operations may relate to initial installation of components in a new vessel, as well as, and more typically, to periodic refueling, maintenance and inspectin operations, during which various vessel components and associated drive rod assemblies must be separately removed from the vessel and various transported and temporarily stored, followed by subsequent reassembly of the vessel components. For example, the advanced reactor design permits refueling operations to be performed in the absence of either control rods or water displacer rods within the lower barrel assembly, or core of the reactor. The method of the present invention utilizes this vessel design feature, in conjunction with the selectively disconnectable drive rod assemblies, to remove the upper internals of the vessel as a mass assemblage, for transporting same to a storage stand, permitting work to be performed thereon in parallel with refueling operations required to be performed in the now exposed lower barrel assembly which remains within the vessel. Further, by remotely and selectively actuating the coupling elements of the respective fuel rod assemblies, the hub extensions thereof are retained within the inner barrel assembly and remain therewith in the upper internals storage stand, while the calandria and associated drive rod portions of the assemblies, now disconnected from the hub portions, are separately transported, en masse, to a second storage stand.

These disassembly operations are performed within a containment structure filled to a predetermined level with boron charged water. Because of the ability to selectively disconnect the drive rod portions from the hub portions of the respective drive rod assemblies, the components may remain submerged, even though only a reasonable level of boron charged water is provided. The disconnectable drive rod assemblies afford the further advantage that the corresponding components thereof are supported on the hub extensions which remain attached to the spider hubs within the inner barrel assembly and thus render same far more accessible during reassembly operations. Particularly, in accordance with the method, the calandria, with the drive rod portions therein, may be transported back into position over the inner barrel assembly and the drive rod portions reconnected to the corresponding hub extensions with far greater ease, and while maintaining the drive rod portions submerted in the boron charged water. This both simplifies the handling tool design and permits an operator to perform "hands-on" control of the handling tool, without having to touch or otherwise be exposed to the drive rod portions themselves. By contrast, drive rods of the requisite length of a unitary or one piece design would not only extend substantially above the water level for substantial time periods during assembly operations, presenting the problems of air contamination and exposure of maintenance personnel to the rods, but also require that maintenance personnel directly engage the rods when aligning same for reconnection to the corresponding clusters. Significantly, as contrasted to conventional designs employing a one piece drive rod with which the handling tool must travel the entire length of the guide rod such that the lower end of the drive rod engages the rod cluster and particularly the hub of the associated spider at a position approximately 48' under water, the structure of the present invention permits the hub extensions to remain attached to the spider hubs, disposing the upper end of the hub extension carrying the quick disconnect coupling at a position between the top of the rod guide and the adjacent, lower calandria subplate. Thus, the handling tool does not have to be inserted through the rod guide region at all, and the disconnect coupling on the upper end of the each hub extension is located only some 35' below the water level, thus greatly simplifying engagement operations and handling tool design.

The assembly/disassembly method and the two-piece, selectively disconnectable drive rod assemblies having respectively different mating configurations of the quick disconnect couplings for the WDRC drive rods, versus the RCC drive rods, in accordance with the invention, thus will be seen to offer numerous advantages, both in fabrication and transportation of the drive rod assembly components, and also in the handling and the utilization of same during both initial assembly of, and subsequent disassembly/assembly-maintenance operations required to be performed on, pressurized water reactors of advanced design type as herein contemplated. These and other advantages will become more apparent from the following detailed description, taken in conjunction with the accompanying drawings.

BRIEF DESCRIPTION OF THE DRAWINGS

FIG. 2 is a simplified, or schematic, cross-sectional plan view illustrating the relatively dense packing of water displacer rod clusters and control rod clusters within the inner barrel assembly of the reactor vessel of FIG. 1;

FIG. 7 is an elevational, cross-sectional view of a displacer rod drive mechanism (DRDM);

FIG. 8 is a cross-sectional view, taken along the line 8—8 in FIG. 7;

FIG. 10 is a longitudinal cross-sectional view of a CRDM drive rod;

DETAILED DESCRIPTION OF THE PREFERRED EMBODIMENTS

Figure 1A:
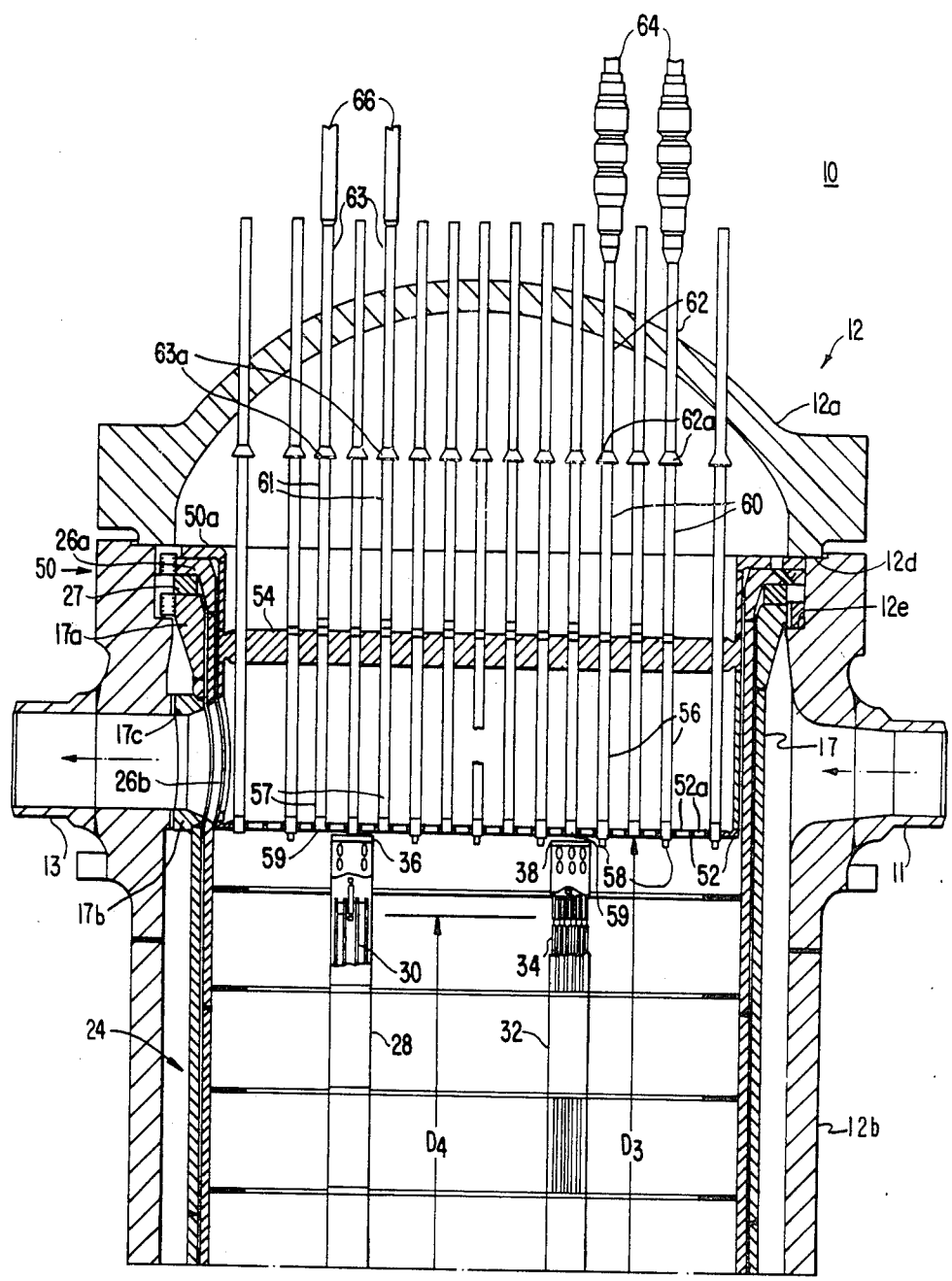
FIG. 1 (comprised of two parts, FIG. 1A and FIG. 1B) is an elevational view, partially in cross-section, of a pressurized water reactor of the advanced design type incorporating two-piece drive rod assemblies having selectively and remotely actuated, quick-disconnect couplings in accordance with the invention, and with which the method for assembly/disassembly in accordance with the present invention are intended to be employed.
Figure 1B:
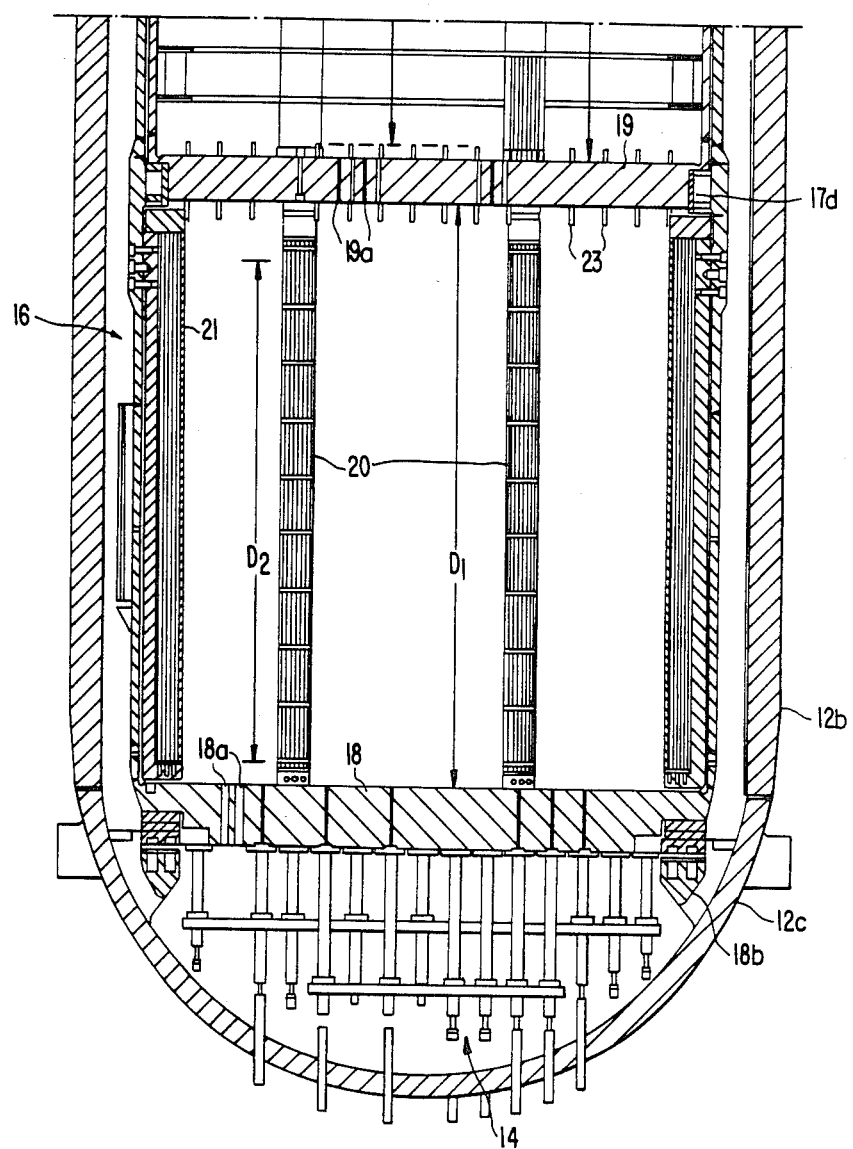

The composite of FIGS. 1A and 1B (referred to hereinafter as FIG. 1) is an elevational view, partly in cross-section, of a pressurized water reactor 10 comprising a vessel 12 including an upper dome, or head assembly, 12a, cylindrical sidewalls 12b, and a bottom closure 12c comprising the base of the reactor 10. Plural radially oriented inlet nozzles 11 and outlet nozzles 13 (only one (1) of each appearing in FIG. 1) are formed in the sidewall 12b, adjacent the upper, annular end surface 12d of the sidewall 12b. Whereas the cylindrical sidewall 12b may be integrally joined, as by welding, to the bottom closure 12c, the head assembly 12a is removably received on the upper, annular end surface 12d of the sidewall 12b and secured thereto. The sidewall 12b further defines an inner, generally annular mounting ledge 12e for supporting various internals structures as later described. Within the bottom closure 12c, as schematically indicated, is so-called bottom-mounted intrumentation 14.

The lower barrel assembly 16 comprises a generally cylindrical sidewall 17 affixed at its lower end to a lower core plate 18, which is received on mounting support 18b, as generally schematically illustrated. The cylindrical sidewall 17 extends substantially throughout the axial height of the vessel 12 and includes an annular mounting ring 17a at the upper end thereof which is received on the annular mounting ledge 12e thereby to support the assembly 16 within the vessel 12. As will be rendered more apparent hereafter, the sidewall 17 is solid in the vicinity of the inlet nozzles 11, but includes an aperture 17b having a nozzle ring 17c mounted therein which is aligned with and removably secured to the outlet nozzle 13. An upper core plate 19 is supported on a mounting support 17d affixed to the interior surface of the cylindrical sidewall 17 at a position approximately one-half the axial height thereof. Fuel rod assemblies 20 are positioned in generally vertically oriented, parallel axial relationship within the lower barrel assembly 16 by bottom mounts 22 carried by the lower core plate 18 and by pin-like mounts 23 carried by, and extending through, the upper core plate 19. Flow holes 18a and 19a (only two of which are shown in each instance) are provided in predetermined patterns, extending substantially throughout the areas of the lower and upper core plates 18 and 19, the flow holes 18a permitting passage of a reactor coolant fluid into the lower barrel assembly 16 in heat exchange relationship with the fuel rod assemblies 20 defining the reactor core, and the flow holes 19a permitting passage of the core output flow into the inner barrel assembly 24. A neutron reflector and shield 21 is mounted interiorly of the cylindrical sidewalls 17, in conventional fashion.

The inner barrel assembly 24 includes a cylindrical sidewall 26 which is integrally joined at its lower edge to the upper core plate 19. The sidewall 26 has secured to its upper, open end, an annular mounting ring 26a which is received on an annular hold-down spring 27 and supported along with the mounting ring 17a on the mounting ledge 12e. The sidewall 26 further includes an aperture 26b aligned with the aperture 17b and the output nozzle 13. Within the inner barrel assembly 24, and densely packed within the cylindrical sidewall 26, are positioned a plurality of rod guides in closely spaced, parallel axial relationship; for simplicity of illustration, only two such rod guides are shown in FIG. 1, namely rod guide 28 housing a cluster of radiation control rods 30 (RCC) and a rod guide 32 housing a cluster of water displacement rods 34 (WDRC). Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50, and particularly to a lower calandria plate 52.

The calandria assembly 50 includes, in addition to the lower calandria plate 52, an upper calandria plate 54 and a plurality of parallel axial calandria tubes 56 and 57 which are positioned in alignment with corresponding apertures in the lower and upper calandria plates 52 and 54 and to which the calandria tubes 56 and 57 are mounted at their respective, opposite ends. More specifically, calandria extensions 58 and 59 extend through corresponding apertures in and are secured to the lower calandria plate 52, and the corresponding calandria tubes 56 and 57 are respectively secured to the extensions 58 and 59. Similar structures connect the upper ends of the calandria tubes 56 and 57 to the upper calandria plate 54.

For the specific configurations of the respective calandria extensions 58 and 59 as illustrated, only the calandria extensions 58 project downwardly from the lower calandria plate 52 and connect to corresponding mounting means 36 for the upper ends, or tops, of the RCC rod guides 28. The upper end mounting means 38, associated with the WDRC rod guides 32, may be interconnected by flexible linkages to the mounting means 36 of the RCC rod guides 28, in accordance with the invention of the pending application, entitled: "FLEXIBLE ROD GUIDE SUPPORT STRUCTURE FOR INNER BARREL ASSEMBLY OF PRESSURIZED WATER REACTOR"—Gillett et al., assigned to the common assignee herewith. Alternatively, the WDRC rod guides 32 may be connected independently to the lower calandria plate 52 by the top end support structure of the invention disclosed in the copending application, entitled: "TOP END SUPPORT FOR WATER DISPLACEMENT ROD GUIDES OF PRESSURIZED WATER REACTOR"—Gillett et al., assigned to the common assignee hereof. In the latter instance, the calandria extensions 59 likewise project downwardly from the plate 52, similarly to the extensions 58, to engage and laterally support the WDRC mounting means 38.

Extending upwardly beyond the upper calandria plate 54 and, more particularly, within the head assembly 12a of the vessel 12, there are provided plural flow shrouds 60 and 61 respectively aligned with and connected to the plural calandria tubes 56 and 57. A corresponding plurality of head extensions 62 and 63 is aligned with the plurality of flow shrouds 60, 61, the respective lower ends 62a and 63a being flared, or bell-shaped, so as to facilitate assembly procedures and, particularly, to guide the drive rods (not shown in FIG. 1) into the head extensions 62, 63 as the head assembly 12a is lowered onto the mating annular end surface 12d of the vessel sidewall 12b, as later explained in reference to FIGS. 9A and 9B. The flared ends 62a, 63a also receive therein the corresponding upper ends 60a, 61a of the flow shrouds 60, 61 in the completed assembly, as seen in FIG. 1. The head extensions 62, 63 pass through the upper wall portion of the head assembly 12a and are sealed thereto. Control rod cluster (RCC) displacement mechanisms 64 and water displacement rod cluster (WDRC) displacement mechanisms 66 are associated with the respective head extensions 62, 63 flow shrouds 60, 61 and calandria tubes 56, 57 which, in turn, are associated with respective clusters of radiation control rods 30 and water displacement rods 34. The RCC displacement mechanisms (CRDM's) 64 may be of well known type, as are and have been employed with conventional reactor vessels. The displacer mechanisms (DRDM's) 66 for the water displacer rod clusters (WDRC's) 34, as employed with the present invention, may be in accordance with the disclosure of U.S. Pat. No. 4,439,054—Veronesi, as before noted.

The selectively disconnectable drive rod assemblies, and the related methods of assembly/disassembly in accordance with the present invention, while necessarily incorporated in the vessel 12, are not illustrated therein in FIG. 1 to avoid unduly complicating the illustrated structure. However, the respective drive rods associated with the CRDM's 64 and the DRDM's 66 are structurally and functionally the equivalent of an elongated, rigid rod extending from and in association with the respective CRDM's 64 and DRDM's 66 to the respective clusters of radiation control rods (RCC's) and water displacements rods (WDRC's) 30 and 34. The CRDM's and DRDM's 64 and 66 thus function through the corresponding drive rods to control the respective vertical positions of, and particularly, selectively to lower and/or raise, the RCC's 30 and the WDRC's 34 through corresponding openings (not shown) provided therefore in the upper core plate 19, telescopingly into or out of surrounding relationship with the respectively associated fuel rod assemblies 20.

In this regard, the interior height $D_1$ of the lower barrel assembly 16 is approximately 178 inches, and the active length $D_2$ of the fuel rod assemblies 20 is approximately 153 inches. The interior, axial height $D_3$ is approximately 176 inches, and the extent of travel, $D_4$, of the rod clusters 30 and 34 is approximately 149 inches. It follows that the extent of travel of the corresponding CRDM and DRDM drive rods is likewise approximately 149 inches.

While the particular control function is not relevant to the present invention, insofar as the specific control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into or withdrawn from the core and with the effective water displacement which is achieved by selective positioning of the water displacement rod clusters 34. It is significant, however, that the RCC's 30 are adjusted in position relatively frequently, compared to the WDRC's 34, to achieve the desired power output level from the reactor. Conversely, the WDRC's 34, initially, are lowered, or inserted, fully into the lower barrel assembly 16 at the initiation of each fuel cycle. The WDRC's 32, through their respective drive rods (not shown in FIG. 1) and DRDM's 66, then are selectively removed as the excess reactivity is depleted, over the fuel cycle. Typically, this is performed by simultaneously removing a group of four such WDRC's 34 from their fully inserted positions in association with the fuel rod assemblies 20, to a fully raised position within the corresponding WDRC guides 32 and thus within the inner barrel assembly 24, in a continuous and controlled withdrawal operation. More specifically, the four WDRC's 34 of a given group are selected so as to maintain a symmetrical power balance within the reactor core, when the group is withdrawn. Typically, all of the WDRC's 34 remain fully inserted in the fuel rod assemblies 20 for approximately 60% to 70% of the approximately 18 month fuel cycle. Groups thereof then are selectively and successively moved to the fully withdrawn position as the excess reactivity is depleted, so as to maintain a nominal, required level of reactivity which can sustain the desired output power level, under control of the variably adjustable RCC's 30. The vent system of the related invention, referenced above, thus serves to provide hydraulic energizing fluid to the DRDM's 66 in accordance with selectively controlling the WDRC raising and lowering functions, as above described.

The reactor coolant fluid, or water, flow through the vessel 10 proceeds generally from a plurality of inlet nozzles 11, one of which is seen in FIG. 1, downwardly through the annular chamber between an outer generally cylindrical surface defined by the interior surface of the cylindrical sidewall 12b of the vessel 12 and an inner generally cylindrical surface defined by the cylindrical sidewall 17 of the lower barrel assembly 16. The flow then reverses direction and thereafter passes axially upwardly through flow holes 18a in the lower core plate 18 and into the lower barrel assembly 16, from which it exits through a plurality of flow holes 19a in the upper core plate 19 to pass into the inner barrel assembly 24, continuing in parallel axial flow therethrough and finally exiting upwardly through flow holes 52a in the lower calandria plate 52. Thus, parallel axial flow conditions are maintained through both the lower and inner barrel assemblies 16 and 24. Within the calandria 50, the flow in general turns through 90° to exit radially from a plurality of outlet nozzles 13 (one of which is shown in FIG. 1). The reactor coolant flow proceeds as well into the chamber defined by the head assembly 12a through certain bypass passageways (not shown in FIG. 1), associated with the mounting of the calandria tubes 56 and 57 to the upper calandria plate 54 and also in accordance with the connections of the head extensions 62, 63 and the flow shrouds 60, 61. Pertinent to the present invention, however, are the flared ends 62a and 63a of the corresponding head extensions 62, 63 which function to guide the corresponding flow shrouds 60, 61 into alignment during assembly of the head assembly 12a with the sidewall 12b to achieve the assembled relationship illustrated in FIG. 1.

The pressure of the cycle water, or reactor coolant, within the vessel 10 typically is in the range of about 2,250 psi, and provides the energy source, or fluid pressure, to the DRDM's 66 for raising the DRDM drive rods from a fully inserted to a fully withdrawn, or up position, as described more fully in the related, above-identified application.

FIG. 2 is a cross-sectional, schematic bottom planar view of the lower calandria plate 52 at a position, in FIG. 1, intermediate the mounting means 36 and 38 for the RCC and WDRC rod guides 28 and 32, respectively, and the plate 52; further, FIG. 2 is on an enlarged scale, and represents only a quadrant of the internal structure of the calandria 50 for illustrating diagramatically the dense packing of the arrays of plural control and water displacer rod clusters 30 and 34 within the inner barrel assembly 24. Each of the circles labelled "D" designates an aperture, or hole, in the calandria plate 52 through which is received a corresponding DRDM drive rod, associated with a corresponding WDRC cluster 34; similarly, each of the circles marked "C" designates an aperture in the calandria plate 52 through which is received a corresponding DRDM drive rod, associated with a corresponding RCC cluster 30. These apertures C and D provide fluid communication with the corresponding RCC and WDRC calandria tubes 56 and, particularly, through the shrouds 61 and head extensions 63 for communicating the reactant coolant pressure to the DRDM's 66. Further, the remaining unlabelled circles in the lower calandria plate 52 in FIG. 2 correspond to the apertures 52a shown in FIG. 1, which provide for communicating the reactor coolant flow from the inner barrel assembly 24 to the calandria 50.

Elements 74 comprise leaf springs which are mounted by bolts 76 to the calandria lower plate 52 in oppositely oriented pairs, generally in alignment with the diameters of the RCC associated apertures "C," in an alternating, orthogonally related pattern. The free ends of the springs 74 bear downwardly upon the upper surfaces of the RCC mounting means 36 of a next-adjacent aperture "C," so as to provide a frictional force opposing lateral displacement thereof and accordingly of the associated rod guide 28, while affording a degree of flexibility to the axial position of the rod guide. While the use of springs 74 is one preferred structural mounting means for the RCC guides, in accordance with the disclosure of the above noted, copending application, entitled: "FLEXIBLE ROD GUIDE SUPPORT STRUCTURE FOR INNER BARREL ASSEMBLY OF PRESSURIZED WATER REACTOR," alternative mounting means may be employed for this purpose and thus the foregoing described structure is not to be deemed limiting in any sense, but merely illustrative.

Figure 12:
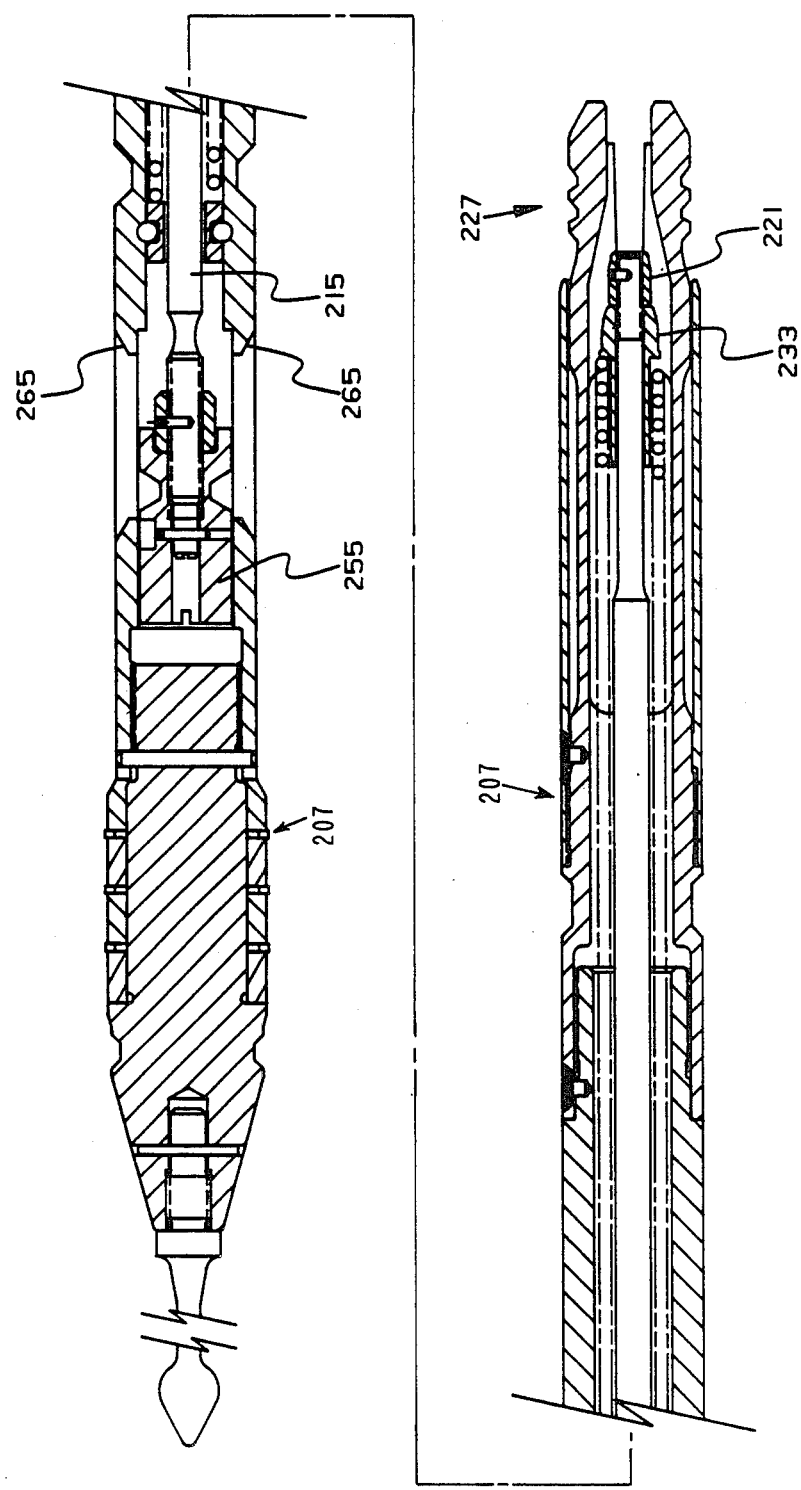

FIG. 2 also illustrates the relative locations of the plural inlet and outlet nozzles 11 and 13 as seen in FIG. 1, it being understood that the quadrant of the vessel shown in the plan view of FIG. 12 is reflected as a mirror image about the 90° axis illustrated thereon and the combined configuration then is reflected about the 0°/180° axis to establish the full (360°) configuration of the vessel 12. Thus, there are provided a total of four inlet nozzles 11, two being equiangularly displaced about each of the 90° and 270° positions, and a total of four outlet nozzles 13, two being equiangularly displaced about each of the 0° and 180° positions. As will be apparent by comparison of FIGS. 1 and 2 and as will become more apparent with reference to the subsequent FIGS. 3 through 8 hereof, the RCC clusters and WDRC clusters are disposed in densely packed, interleaved arrays, substantially across the entire cross-sectional area of the inner barrel assembly 24. The RCC and WDRC rod clusters 30 and 34 are supported by corresponding spiders 100 and 120, as illustratively shown in FIGS. 3 to 6, in turn connected through corresponding drive rods to the CRDM's 64 and DRDM's 66, an example of the DRDM 66 being shown in FIGS. 7 and 8, as hereafter described.

Figure 3:
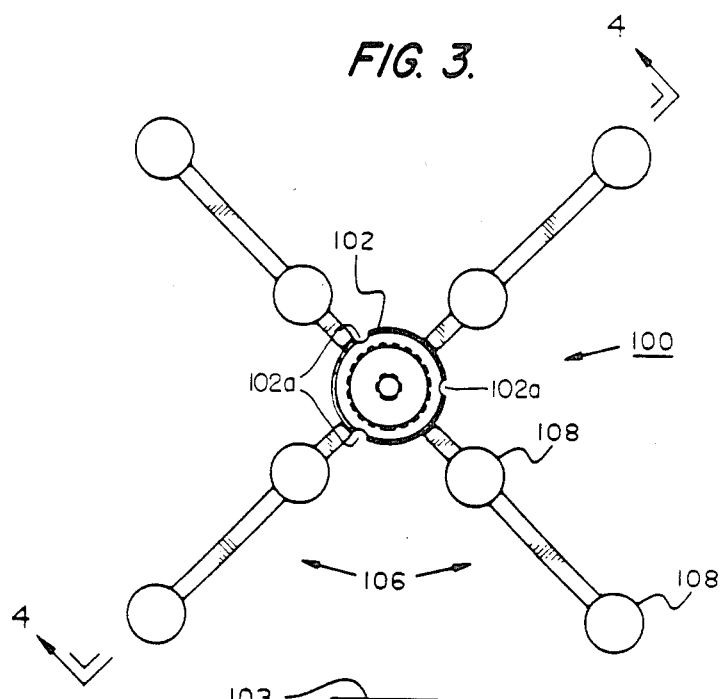
FIG. 3 is a plan view of an RCC spider.
Figure 4:
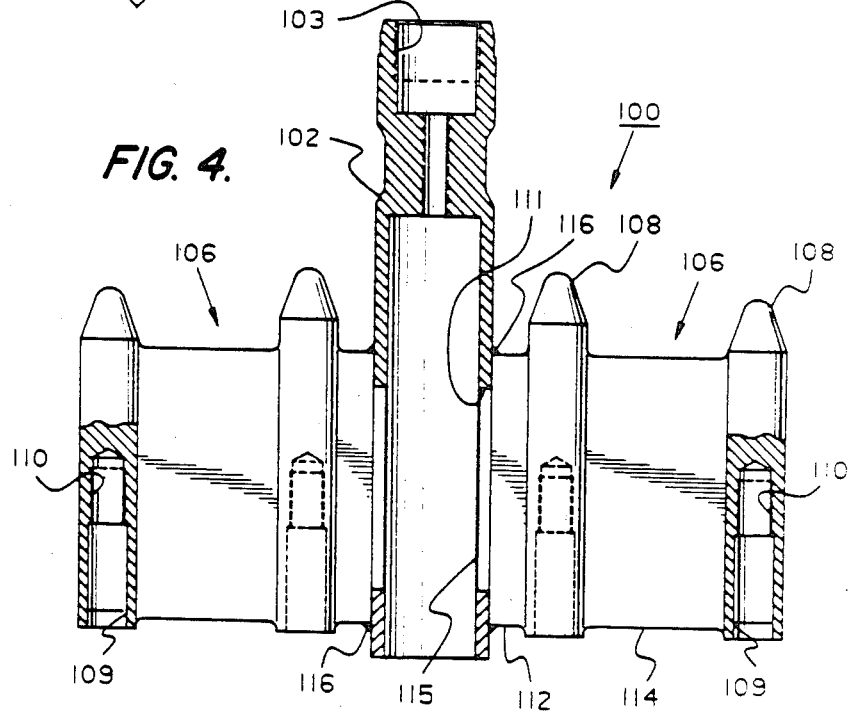
FIG. 4 is an elevational view, partially in cross-section, of the RCC spider of FIG. 3, taken along the line 4—4 in FIG. 3.

FIGS. 3 and 4 are plan and elevational views of an RCC spider 100, FIG. 3 being schematic in form and FIG. 4 being a partly broken-away, cross-sectional view taken along the line 4—4 in FIG. 3. The RCC spider 100 comprises a central hub 102 of generally cylindrical configuration having an upper, interiorally threaded end 103 for connection to a drive rod (not shown) which extends, as before described, upwardly to an RCC adjustment mechanism 64 by which the spider 100 and its associated control rods 30 (FIG. 1) may be vertically adjusted in position within and relative to the RCC rod guide 28 and correspondingly relative to the fuel rod assemblies 20, of FIG. 1. Vane assemblies 106 are secured at the respective inner edges thereof to the hub 102 and extend radially therefrom in quadrature, relative relationship. Each vane assembly 106 includes a pair of cylindrically-shaped rod support mounts 108, each thereof having an interior bore 109 including an interiorally threaded portion 110 into which the upper, correspondingly threaded end of a control rod (not shown) is threadingly engaged so as to be supported by the vane assembly 106 and corresponding hub 102.

Figure 5:
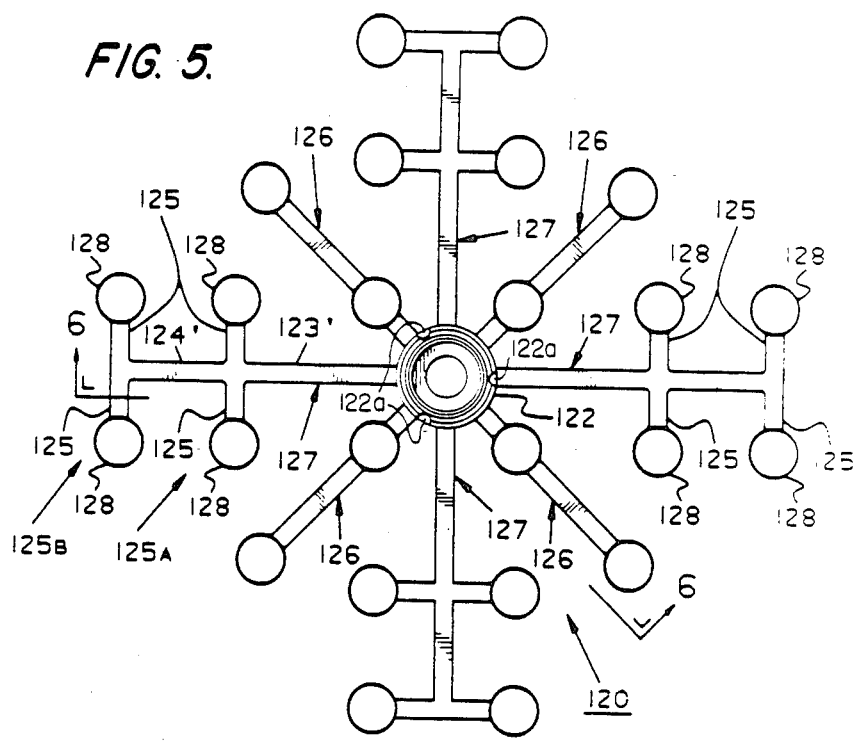
FIG. 5 is a plan view of a WDRC spider.
Figure 6:
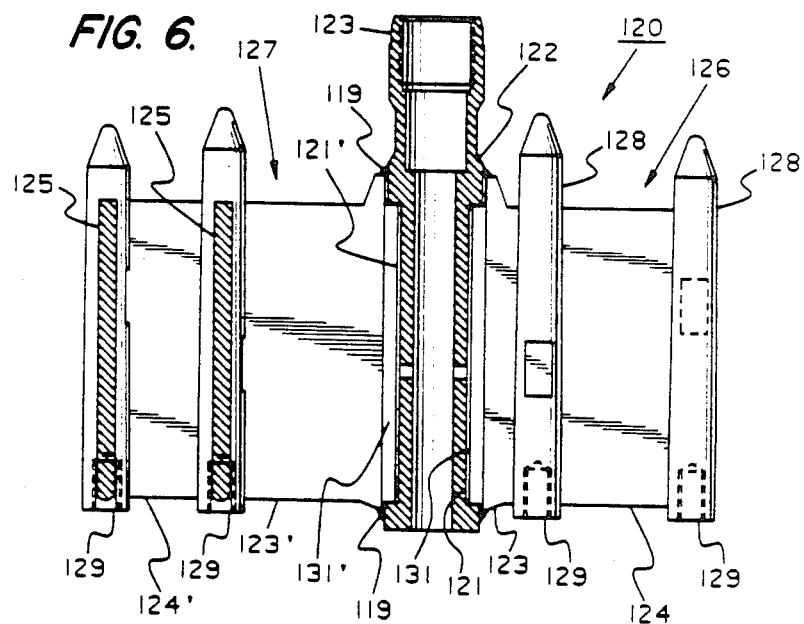
FIG. 6 is an elevational view, partially in cross-section, of the WDRC spider of FIG. 5, taken along the line 6—6 of FIG. 5.

FIGS. 5 and 6 illustrate a WDRC spider 120, FIG. 5 being a planar, generally schematic view, and FIG. 6 being an elevational view, partially in cross-section and taken along the line 6—6 in FIG. 5. Similarly to the RCC spider 100, the WDRC spider 120 includes a central hub 122 of generally cylindrical configuration, the upper end 123 being interiorally threaded to receive a drive rod which, as discussed in connection with FIG. 1, connects to a corresponding WDRC control mechanism 66. First and second types of vane assemblies 126, 127 are connected to the hub 122 in alternating, equiangularly displaced relationship so as to extend radially therefrom. The vane assemblies 126 are substantially similar to the RCC vane assemblies 106, as seen in FIGS. 3 and 4, and thus include a pair of radially displaced WDRC rod support mounts 128. As best seen in FIG. 5, the vane assemblies 126 are disposed to extend radially from the hub 122 in quadrature relationship, each intermediate an adjacent quadrature-related pair of vane assemblies 106 in the alternating sequence as above described. The vane assemblies 127 include integral, transverse vanes 125 extending from the integral radial vane segments 123' and 124° as first and second aligned and oppositely oriented pairs 125A and 125B, each thereof carrying a WDRC rod support mount 128 at its extremity. Each of the WDRC rod support mounts 128 includes a threaded bore 129 at its lower extremity for receiving, in threaded engagement therein, the top end of a corresponding WDRC rod.

The vane assemblies 106 and 126 include corresponding first and second planar vane elements 112, 114 and 123, 124, respectively, each thereof having longitudinal flanges for connecting the associated vane assemblies 106 and 126 to the respective, RCC spider hub 102 and WDRC spider hub 122. This structure is illustrated for the RCC spider 100 in FIG. 4 by the receiving slot 111 in the hub 102 and the flange 115 received therein, and is illustrated for the WDRC spider 120 in FIG. 6 by the receiving slot 121 in the hub 122 and the flange 131 associated with the first planar vane element 123, received therein.

The second type of vane assembly 127 of the WDRC spider 120, as seen in FIG. 6, corresponds substantially to the first vane assembly 126 in that it includes first and second planar vane element portions 123' and 124' which are integrally formed and extend radially from the hub 122, the first portion 123' having a longitudinal flange 131' received in a corresponding receiving slot 121' in the hub 122. The assembly 127 furthermore includes first and second pairs 125a and 125b of third planar vane elements 125 integrally formed with and extending transversely from the first and second integral vane element portions 123' and 124', the first pair 125a being formed intermediate the portions 123' and 124' and the second pair 125b being formed on the outer longitudinal edge of the second vane element portion 124'. Each of the elements 125 carries a rod support mount 128 on its outer longitudinal edge. It will be understood that the third, or transverse, planar vane elements 125 may include similar flange structures on their outer longitudinal edge for mounting the corresponding rod support mounts 128.

In assembling the respective RCC and WDRC spiders 102 and 120, the innermost planar vane elements 112, and 123, 123' preferably are positioned with the respective flanges 115 and 131, 131' inserted into the corresponding receiving slots 111 and 121, 121' of the associated hubs 102 and 120, and then spot welded in place at the upper and lower extremities thereof, as indicated by weld beads. Thereafter, the joints are brazed along the entirety of the lengths thereof.

Referring now to FIG. 7, the displacer rod drive mechanism (DRDM) 66 receives a drive rod 132 which is connected to a WDRC spider 120. The DRDM 66 is shown more fully in the noted U.S. Pat. No. 4,439,054. Briefly, the DRDM 66 comprises a substantially cylindrical metal housing 136 which is welded to a head extension 62, which extends through the dome, or head 12a. Housing 136 has a cap 138 attached to the top thereof which has a channel 140 therethrough that is connected to conduit 80, as shown in FIG. 1. Since the interior of housing 136 is exposed to the interior of reactor vessel 12, the reactor coolant fills the void spaces within housing 136 and flows therefrom through channel 140 and conduit 80 under controlled conditions, to be explained. A bearing housing 146 is removably disposed within housing 136 and has a plurality of first piston rings 148 attached to the outside thereof near its lower end which extend into contact with the inside of housing 136 for aligning bearing housing 146 within housing 136 but allowing for the removal of bearing housing 146. Drive rod 132 is slidably disposed within bearing housing 146 in a manner so as to be able to be moved axially with respect to bearing housing 146 and housing 136 under the influence of the reactor coolant pressure. A plurality of second piston rings 150, which may be Inconel, are removably disposed within bearing housing 146 so as to be able to contact drive rod 132. Second piston rings 150 provide a mechanism for allowing drive rod 132 to slide within bearing housing 146 while limiting the flow of reactor coolant through bearing housing 146 and housing 136 when the vent system permits fluid flow through conduit 80, the movement of drive rod 132 thus being controlled by the vent system of the invention. Second piston rings 150 are arranged so that they may be replaced when bearing housing 146 is removed from housing 136.

Referring now to FIGS. 7 and 8, a plurality of roller bearings 152 are disposed on a like number of axles 154 in a manner so as to allow the outer surface of roller bearings 152 to contact the outer surface of drive rod 132 while allowing the rotation of roller bearings 152. As shown in FIG. 8, four roller bearings 152 may be used so as to align drive rod 132 within bearing housing 146 while aiding in the movement of drive rod 132. A plurality of screws 156 corresponding to the number of roller bearings 152 are used to attach holding member 158 to bearing housing 146 so as to hold roller bearings 152 within bearing housing 146 yet allow replacement thereof by removal of screws 156 and holding member 158. In a like manner, a second set of roller bearings 160 are disposed at the other end of bearing housing 146 to provide alignment of drive rod 132.

Referring again to FIG. 7, drive rod 132 has a flexible rod 162 attached to the top end thereof which may be an Inconel rod. Flexible rod 162 has a spear-shaped member 164 attached to its top end. A hollow cylindrical divider 166 is attached to the lower end of cap 138, in colinear alignment with channel 140. Divider 166 defines chambers 168, 169 and 170 in the bottom end of cap 138, each of a size to accommodate the spear member 164. The spear-shaped member 164 cooperates with a pivoted latch mechanism 172 in a manner more fully described in U.S. Pat. No. 4,439,054. The latch 172 is normally spring biased to the slanted, or angularly offset position indicated in FIG. 7, and is mounted for pivotal movement in a clockwise direction in which the right-hand side thereof engages the interior of the wall of housing 136. Generally, during upward movement of the rod 132, the spear-shaped member moves upwardly along the slanted surface of the latch mechanism 172 as indicated in phantom lines, ultimately passing beyond the upper edge thereof and being received in the first chamber 168, the latch 172 being deflected by that movement to pivot in a clockwise direction and provide clearance for the motion of the spear shaped member 164 and then returning to its initial position by the spring biasing. The bottom end of cap 138 functions as a stop to prevent further upward movement of the member 164 and thus the drive rod 132. When pressure is equalized within the DRDM 66 so as to remove the differential pressure driving the rod 132 upwardly, in a manner to be described, the weight of the rod 132 and attached WDRC cluster causes the same to fall by gravity, the member 164 being received in the first bore 178 of the latch 172 and supported on ledge 182 to stop the downward movement, this action furthermore pivoting latch 172 to a vertically aligned position thus locking, or parking, the rod 132 in its up position. The drive rod 132 thus must perform an over-travel movement, so as to be engaged and locked by the latch 172.

To release the drive rod 132 from the locked, up position, an over-travel movement of the drive rod 132 must again be performed; accordingly, the vent system produces a pressure differential within the DRDM 66 which acts on the rod 132 so as to drive it upwardly through the bore 178 and into the central chamber 170, upward movement again being halted by the surface of cap 168 which acts as a stop on the element 164. The pressure differential then is removed by suitable controls of the vent system to establish pressure equilibrium in the DRDM 66, and thereby to permit the rod 132 and its associated WDRC 34 to fall by weight of gravity, pulling the member 164 through the second bore 180 and in turn pivoting the latching mechanism 172 in a clockwise direction; since bore 180 extends axially throughout the latch mechanism 172, member 164 is free to pass therethrough and thus permit rod 132 and its associated WDRC 34 to fall gradually throughout the entire extent of its travel, fully inserting the WDRC 34 into association with the fuel assemblies 20 in the lower barrel 16. As described more fully in the referenced U.S. Pat. No. 4,439,054, latch mechanism 172 includes suitable slots in the generally vertically oriented sidewalls thereof through which the flexible rod 162 may pass, to permit movement thereof transversely through the sidewalls defining the bores 178 and 180 of the latch mechanism 172, the slots of course being smaller than the element 164, which travels through the bores 178 and 180, as above described.

Figure 9A:
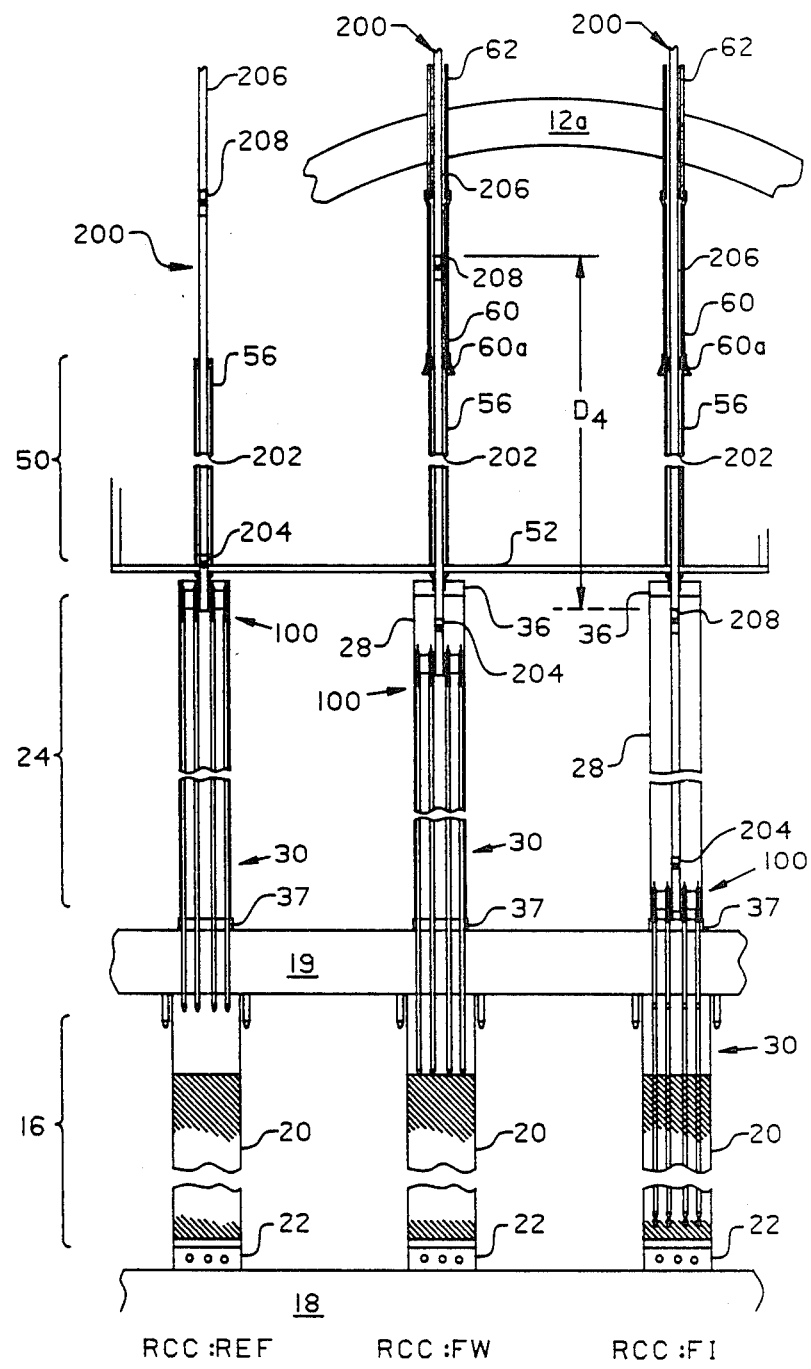
FIGS. 9A and 9B, taken together, comprise partially schematic and broken away, longitudinal cross-sectional views of CRDM and DRDM drive rod assemblies, respectively, variously in fully inserted ("FI"), fully withdrawn ("FW") and refueling ("REF") positions.
Figure 9B:
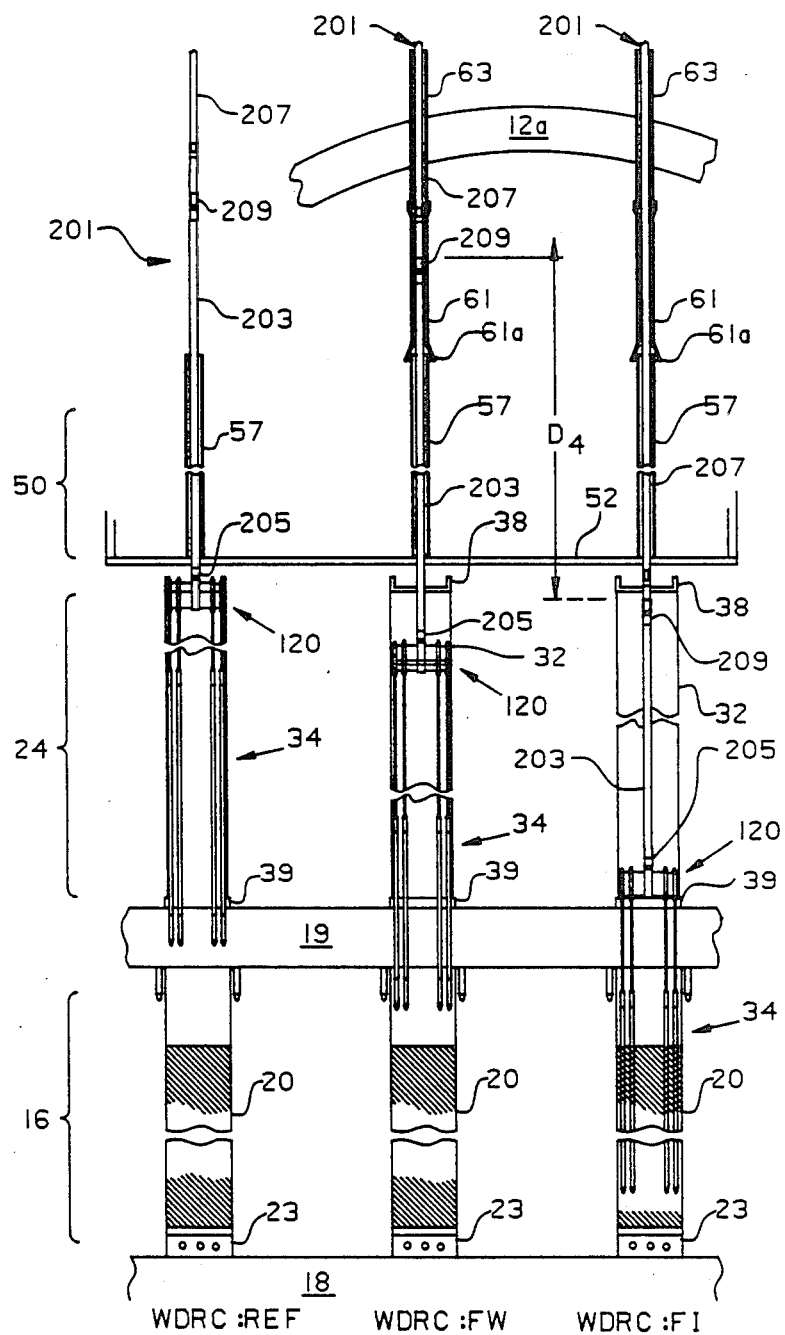

FIGS. 9A and 9B comprise schematic, partially broken away, elevational views of the internals of a reactor vessel 12, as shown in FIG. 1, for illustrating the relationships of the RCC and WDRC clusters 28 and 32 relatively to major components of the pressure vessel 12 of FIG. 1, when the corresponding RCC and WDRC clusters 28 and 32 in FIGS. 9A and 9B, respectively, are in each of the fully inserted ("FI"), fully withdrawn ("FW"), and refueling ("REF") positions, as designated in each of the figures. Thus, in the fully inserted position "FI" in the respective FIGS. 9A and 9B, the corresponding RCC spider 100 and WDRC spider 120 are at the bottom of the corresponding rod guides 28 and 32, supported on the upper core plate 19, with the associated rods thereof in telescoped, fully inserted relationship with the fuel rod assemblies 20. Conversely, in the fully withdrawn positions, the spiders 100 and 120 are closely adjacent the lower calandria plate 52, and the lower ends of the corresponding rods are disposed just above the top ends of the fuel rod assemblies 20. As actually performed in refueling operations, and thus for the respective refueling positions, RCC:REF of FIG. 9A and WDRC:WREF of FIG. 9B, the head assembly 12a and associated shrouds 60, 61 and head extensions 62, 63 are removed, as are the corresponding mounting means 36 and 38; additionally, the respective spiders 100 and 120 are raised further, to a position immediately underlying the lower calandria plate 52.

The refueling positions "REF" of FIGS. 9A and 9B best illustrate the selectively disconnectable CRDM drive rod assembly 200 and DRDM drive rod assembly 201 in accordance with the present invention. While the couplings which interconnect the components of the CRDM and DRDM drive rod assemblies have differently keyed coupling elements to prevent erroneous interconnection of the respective components and thus to assure that only the CRDM components may be interconnected within the CRDM drive rod assembly 200 and, correspondingly, only DRDM components may be interconnected within the DRDM drive rod assembly 201, the basic configurations are substantially similar. Accordingly, in the following, reference will be had concurrently to FIGS. 9A and 9B, the odd and even reference numbers respectively relating to the components of the DRDM drive rod assembly 200 of FIG. 9A and to the components of the DRDM drive assembly 201 of FIG. 9B.

The CRDM and DRDM drive rod assemblies 200 and 201 respectively comprise hub extensions 202, 203 connected to the hubs 102, 122 of the RCC spider 100 and WDRC spider 120 by semipermanent couplings or joints 204, 205 and drive rod portions 206, 207 connected to the respective hub extensions 202, 203 by selectively and remotely actuable quick disconnect couplings 208, 209.

The common, dimensional reference $D_4$ in each of FIGS. 9A and 9B indicates the path of travel of the drive rod assemblies 200, 201 between the fully withdrawn and the fully inserted positions, as referenced to the corresponding positions of the quick disconnect couplings 208, 209 in those respective positions. To afford the reader a greater appreciation of the significant mechanical control operations entailed in providing positioning control of the rod clusters, and to better facilitate a correlation of the schematic representations of FIGS. 9A and 9B with the more detailed, complete view of the vessel 12 in FIG. 1, the common distance $D_4$ of FIGS. 9A and 9B corresponds to the distance $D_4$ in FIG. 1A, which in one actual embodiment of the vessel 12 is approximately 149". The overall height of the inner barrel assembly 24, on the other hand, may be approximately 176". The interior height, $D_1$ of the lower barrel assembly 16 is approximately 178" and the active fuel length, $D_2$, of the fuel rod assemblies 20 is approximately 153", the lower ends of the fuel rod assemblies being displaced by approximately 7" from the upper surface of the lower core plate 18. Thus, insertion of the respective rod clusters 30 and 34 into telescoped relationship with the fuel rod assemblies 20 effectively extends the RCC and WDRC rods 30 and 34 into surrounding relationship with the fuel rod assemblies 20 substantially throughout the active, axial length thereof.

Figure 11:
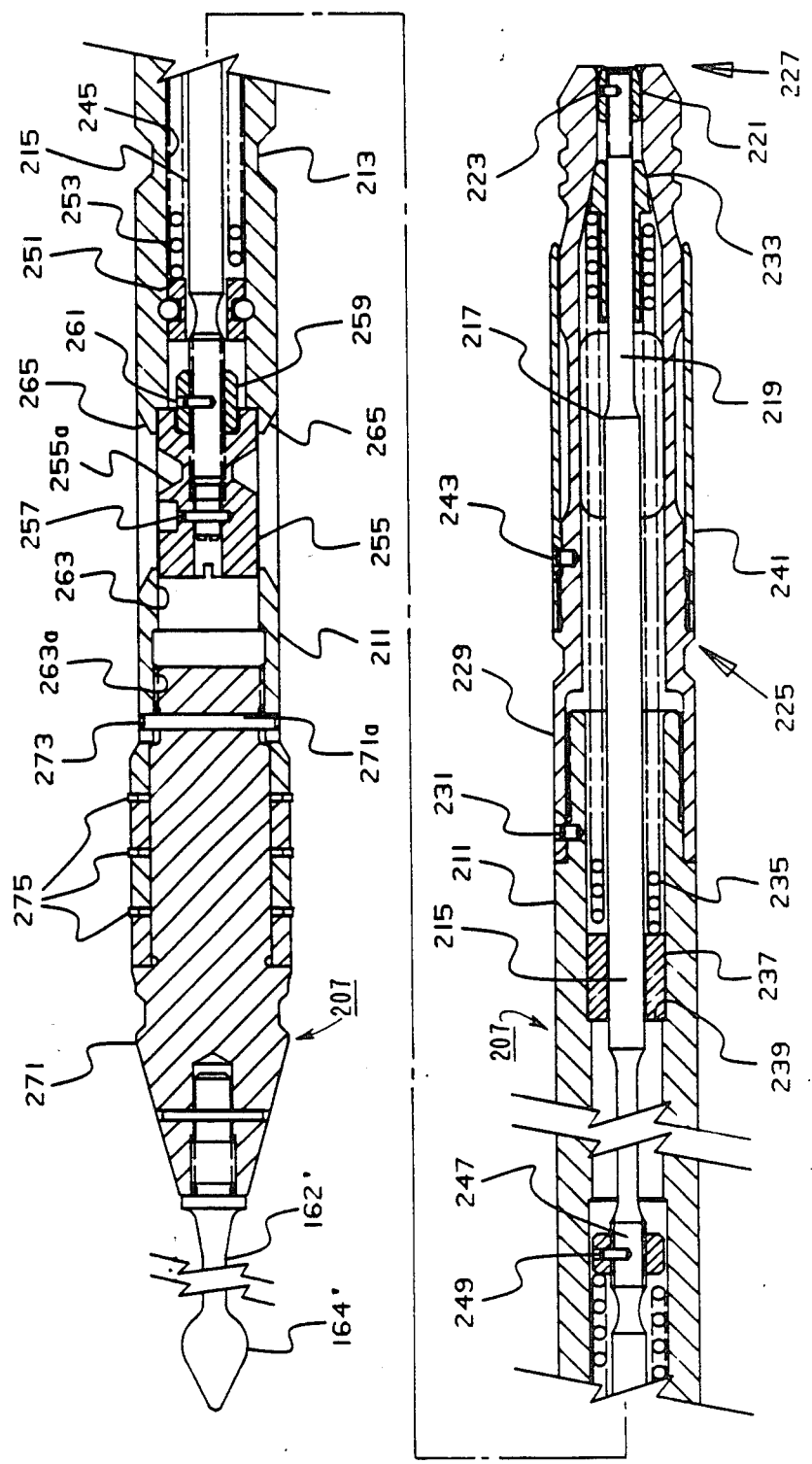
FIGS. 11 and 12 comprise longitudinal cross-sectional views of a DRDM drive rod, respectively illustrating a normal, engaged configuration of the drive rod end flexure and and a disengaged condition thereof produced by actuation of a disconnect button, as employed during assembly/diassembly operations.

FIG. 10 is a longitudinal cross-sectional view of the drive rod portion 206 of the CRDM drive rod assembly 200, corresponding to the similarly configured view of the drive rod portion 207 of the DRDM drive rod assembly 201 of FIG. 11. With concurrent reference to FIGS. 10 and 11 and following the even- and odd-numbered correlation above established, the drive rod portions 206, 207 comprise elongated, generally cylindrical, hollow housings 210, 211 having annular recesses, or necks 212, 213 adjacent the upper ends thereof, for a purpose to be described. Disconnect rods 214, 215 extend throughout the length of the housings 210, 211 and project beyond the lower ends thereof, the projecting portions including shoulders 216, 217 joining reduced diameter shanks 218, 219, on which annular positioning nuts 220, 221 are received and secured thereto by lock pins 222, 223. Couplings 224, 225 of generally cylindrical, hollow configuration, and having keyed, ribbed flexure ends 226, 227 are positioned over the drive rods 214, 215 and threaded at their upper ends 228, 229 onto threaded end portions 210a, 211a, of the housings 210, 211 and secured thereto by pins 230, 231. As will be seen and explained, the flexure ends 226, 227 comprise keyed, male coupling components of the quick disconnect couplings 208, 209 of FIGS. 9A and 9B. Annular buttons 232, 233 are received on the reduced diameter shanks portions 218, 219 and have outer, mating surfaces engaging the general conical interior surfaces 226a, 227a, of the flexure ends 226, 227. Springs 234, 235 are received over the disconnect rods 214, 215, and compressed between the buttons 232, 233 at the lower ends thereof and retainers 236, 237 which are received within the bore of the housing 210, 211 and positioned against annular retainer ledges 238, 239 so as to urge the respective buttons 232, 233 to the extended positions indicated, engaging the conical interior surfaces 226a, 227a. Generally cylindrical, protective sleeves 240, 241 are received about the respective couplings 224, 225 and threadingly engaged thereon and secured in place by corresponding locking pins 242, 243.

The upper ends of the housings 210, 211 incorporate spring housings 244, 245 of relatively enlarged diameters, defining corresponding shoulders therewithin, the respective disconnect rods 214, 215 including enlarged diameter portions 246, 247 on which retainer collars 248, 249 are secured, disposed in the housings 244, 245. Corresponding spring retainers 250, 251 are secured in an upper portion of the housings 244, 245; springs 252, 253 received over the disconnect rods 214, 215 extend in compression between the spring retainers 250, 251 and the retainer collars 248, 249, forcing the corresponding drive rods 214, 215 in an axially downward direction toward the flexure ends 226, 227 and maintaining the positioning nuts 220, 221 in the indicated positions, substantially flush with the open end surfaces of the flexure ends 226, 227.

The upper ends of the CRDM and DRFM drive rod assemblies 200 and 201 are somewhat different and accordingly are discussed individually. Thus, with separate reference to the CRDM drive rod assembly 200 of FIG. 10, a disconnect button 254 of generally cylindrical, hollow configuration and having a reduced diamter annular recess, or neck, 254a is received over the upper end of the disconnect rod 214 and secured thereto by pin 256. A spring 258 is received in an annular, recessed spring seat 258a at the upper end of housing 210. The lower cylindrical portion 254b of the disconnect button 254 is of enlarged diameter, defining a shoulder 254c disposed to engage the spring 258 which thus provides a resilient restraint against vertically upward movement of the button 254 (i.e., to the left in FIG. 10) which would tend to eject the button 254 from within the housing 201, while additionally serving to center the button 254 coaxially therewithin. The lower end 254d of the button 254 engages a corresponding shoulder 260 within the housing 210 which establishes the downward limit of travel of the button 254.

With separate reference to the DRDM assembly 201 of FIG. 11, a disconnect button 255 having a reduced diameter, annular recess, or neck 255a is received on the upper end of the disconnect rod 215 and secured thereto by lock pin 257. Additionally, the disconnect button 255 is received over a locking collar 259 secured to the disconnect rod 215 by a pin 261. As a primary difference from the CRDM assembly 200 of FIG. 10, in the DRDM assembly of FIG. 11, the disconnect button 255 is received within the upper interior portion 263 of the housing 211, the portion 263 being interiorally threaded as shown at 263a. Further, the neck 255a of the button 255 is accessible through slots 265 from the exterior of the housing 211, for a purpose to be described. As another major difference, the DRDM assembly 201 includes a piston 271 having a lower, threaded shank portion 271a received in threaded engagement in the threaded interior portion 263a and secured thereto by pin 273. Piston rings 275 are recessed into the surface of the piston 271. With reference to FIGS. 7 and 8 hereof, it will be understood that the provision of piston rings 275 on the piston 271 as shown in FIG. 11 differs structurally from the arrangement shown in FIGS. 7 and 8 in which corresponding piston rings are mounted within the interior of the element 146; however, the structures are functionally equivalent. Similarly to FIGS. 7 and 8, the piston 271 carries a flexible shaft 162' and a spear-shaped head element 164' which perform the identical functions as the corresponding, but unprimed, numbered elements in FIGS. 7 and 8.

The disconnect function is performed with respect to each of the CRDM and DRDM drive rod assemblies 200, 201 in substantially similar ways, albeit with modifications to take into account the somewhat differing structures thereof. In the case of the CRDM drive rod portion 206 of FIG. 10, a tool is positioned on the upper end of the housing 210 so as to engage the reduced diameter neck 212 of housing 210 and the neck 254a of the disconnect button 254, and then is actuated to drive the disconnect button 254 axially outwardly, thereby to withdraw or retract the disconnect rod 214 and the associated positioning nut 220 and spring button 232 from within the interior of the flexure end 226, permitting the latter to collapse. In the case of the DRDM drive rod portion 207 of FIG. 11, a similar tool is positioned adjacent the upper end of housing 211 so as to engage the reduced diameter neck 213 of the housing 211 and the reduced diameter neck 255a of the button 255, the latter through the slots 265. Similarly, the tool is actuated so as to move the button 255 into the open interior portion 263 at the upper end of the DRDM housing 211 and thereby retract the associated disconnect rod 215 and the corresponding positioning nut 221 and button 233, against the resilient biasing of the spring 235 (which serves to hold button 233 in place against the mating interior surface 227a of the flexure end 227), compressing both springs 235 and 253. The resulting disposition of the parts is shown in FIG. 12, the positioning nut 221 and button 233 being in engagement and retracted such that the flexure end 227 is free to collapse. FIG. 12 thus indicates the corresponding, disengaged condition of the flexure end 226 of the drive rod portion 206 of the CRDM assembly 200, shown in FIG. 10.

Figure 13A:
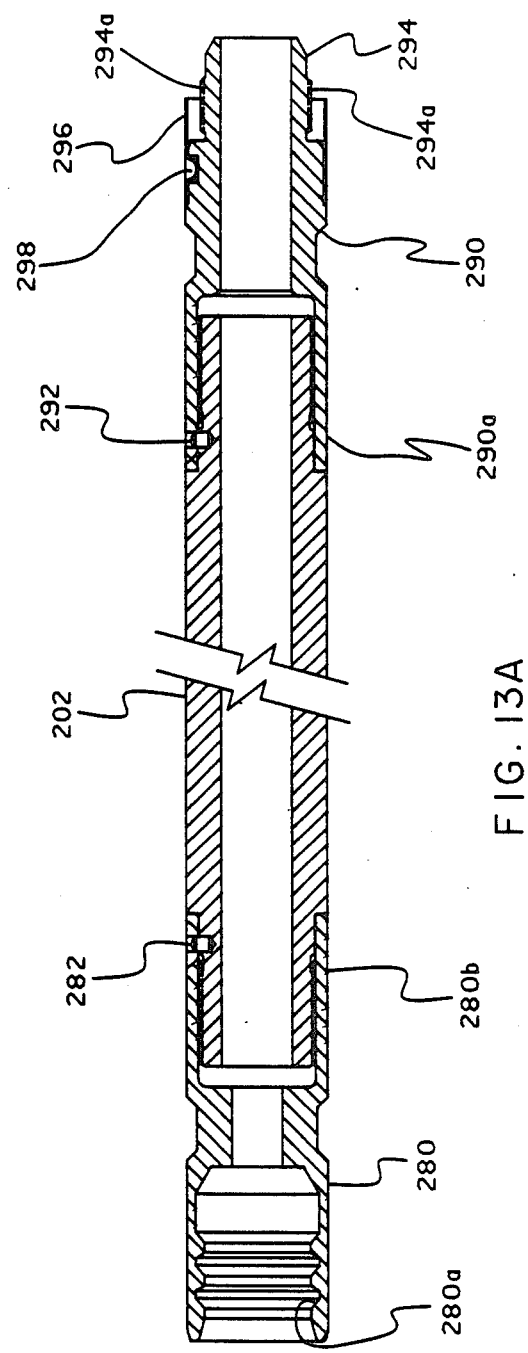
FIGS. 13A and 13B respectively comprise longitudinal cross-sectional views of a DRDM hub extension and a CRDM hub extension, and, by comparison, illustrate the different configurations of the respective quick disconnect and semipermanent couplings components on the upper and lower ends thereof, provided to assure connection of the correct, corresponding WDRC and RCC drive rod portions therewith and of the correct, corresponding WDRC and RCC spider hubs therewith.
Figure 13B:
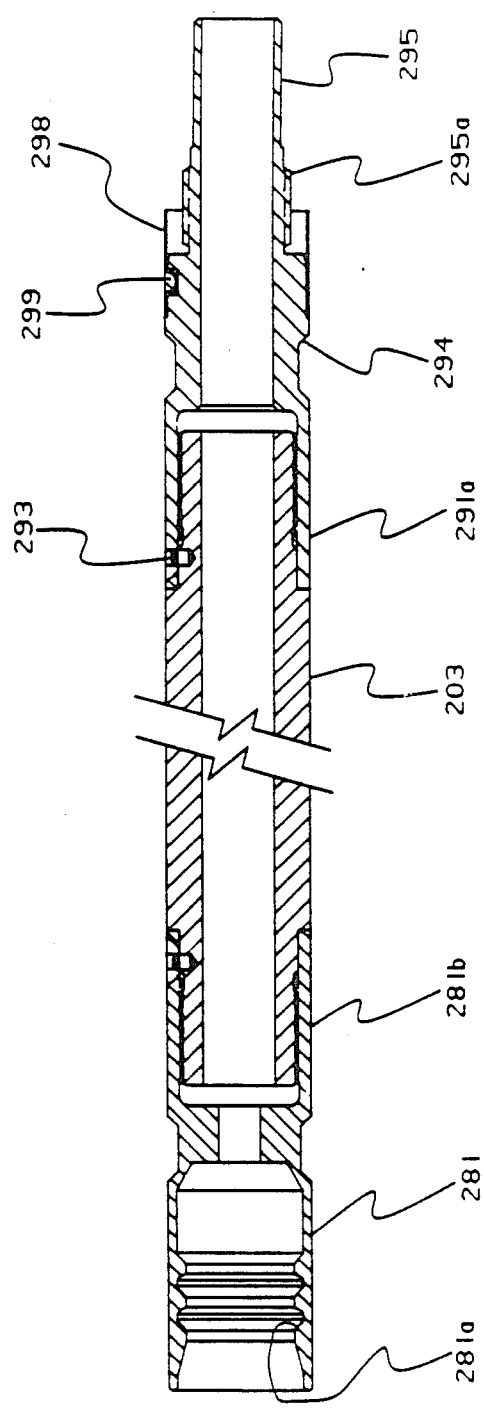

FIGS. 13A and 13B are longitudinal cross-sectional views of the hub extensions 202 and 203 of the CRDM and DRDM drive rod assemblies 200 and 201, respectively. Accordingly, with concurrent reference to FIGS. 13A and 13B, and adopting the even-odd-reference number correlation as before, the hub extensions 202, 203 comprise female coupling elements 280, 281 having interior, keyed surfaces 280a, 281a which mate the exterior, keyed surfaces of the male flexure ends 226, 227 of the CRDM and DRDM drive rod portions 206, 207 and, taken together, comprise the quick disconnect couplings 208, 209 of the respective assemblies 200, 201 as shown in FIGS. 9A and 9B. The coupling elements 280, 281 include interiorly threaded end portions 280b, 281b which are received on the corresponding, threaded upper end portions of the corresponding hub extensions 202, 203.

Male, semipermanent joint elements 290, 291, comprising components of the semipermanent joints 204, 205 (FIGS. 9A and 9B), are of generally cylindrical configuration and include interiorly threaded end portions 290a, 291a by which they are threadingly received on correspondingly threaded lower end portions of the hub extensions 202, 203 and secured in place by pins 292, 293. The male joint elements 290, 291 include stub portions 294, 295, the former being of larger diameter and lesser axial length than the latter, and each having threaded surfaces 294a, 295a. Locking sleeves 296, 297 are received on an enlarged diameter, central portion of the elements 290, 291 and secured in place by indents 298, 299.

The remotely and selectively actuable, quick disconnect couplings 208 and 209 of the CRDM and DRDM drive rod assemblies 200 and 201 of FIGS. 9A and 9B, respectively, thus include as the male components thereof the respective CRDM flexure end 226 of FIG. 10 and DRDM flexure end 227 of FIG. 11 and, as the respectively corresponding female components, the CRDM coupling element 280 of FIG. 13A and the DRDM female coupling element 281 of FIG. 13B.

By joint reference to the foregoing figures, it will be seen that while these components of the respective quick disconnect couplings 208, 209 share generally similar structural configurations, their specific, dimensional configurations render them noninterchangeable, such that erroneous connections between CRDM and DRDM coupling components cannot occur. Specifically, the male CRDM coupling component comprising the flexure end 226 (FIG. 10) is of shorter axial length than the male DRDM coupling element comprising the flexure end 227 (FIG. 11); thus, if the CRDM mail flexure end 226 is accidentally inserted into the DRDM female coupling element 281, the locking sleeve 296 of the former will abut the end of the DRDM coupling element 281, before the respective keyed surfaces 226a and 281a come into engagement; additionally, the contours of the respective keyed surfaces 226a and 281a are axially relatively displaced and thus noninterengagable. Conversely, the male DRDM coupling element comprising the flexure end 227 is of greater axial length than the female CRDM coupling element 280, and the respective keyed surfaces 227a and 280a are axially relatively displaced, such that if the former is accidentally inserted into the latter, the keyed exterior surfaces of the DRDM male flexure end 226 and the interior keyed surface of the female CRDM coupling element 280 would not achieve a mating, or aligned relationship. In both cases of such possible, accidental partial insertion, release of the disconnect button would not result in the positioning nuts 220, 221 returning to engaged position and coupling the corresponding flexure ends 226, 227 to the incorrect female coupling components.

In like fashion, the semipermanent CRDM joint 204 and DRDM joint 205 (FIGS. 9A and 9B), while of similar configurations, nevertheless are noninterchangeable, so that erroneous interconnections cannot occur. Specifically, the interiorly threaded portion 103 of hub 102 of the RCC spider 100 comprises the female component of the semipermanent joint 204 which receives the threaded male stub 294 of the CRDM hub extension 202, these components being of relatively wider diameter but shorter axial length than the corresponding DRDM male stub 295 (FIG. 13B) and female, interiorly threaded portion 123 of the WDRC hub 122 (FIG. 6). Thus, in a similar manner as explained above with respect to the quick disconnect couplings 208, 209, the respective components of the semipermanent joints 204, 205 likewise are not interchangeable and thus cannot be connected incorrectly, when assembling the CRDM hub extension 202 and DRDM hub extension 203 to the corresponding spiders 100 and 120.

Accordingly, when the semipermanent male joint elements 290 and 291 are received in threaded engagement in the respective hub portions 102, 122, of the correctly corresponding RCC and WDRC spiders 100, 120, the locking sleeves 282, 283 are received coaxially over the hubs 102, 122; recesses 102a and 122a in the hubs 102 and 122 (see FIGS. 3 and 5, respectively) permit formation of corresponding indents in the locking sleeves 282, 283 for locking the joints 204, 205 and thereby prevent accidental disassembly. The respective joints 204, 205 are characterized as semi-permanent, inasmuch as by the application of sufficient rotary torque, the hubs 102, 120 may be unscrewed from the hub extensions 202, 203, releasing the indents from one or the other of the elements 290, 291 or the hubs 102, 120, and thereby separating the hub extensions 202, 203 from the corresponding spiders 100, 120.

Figure 14:
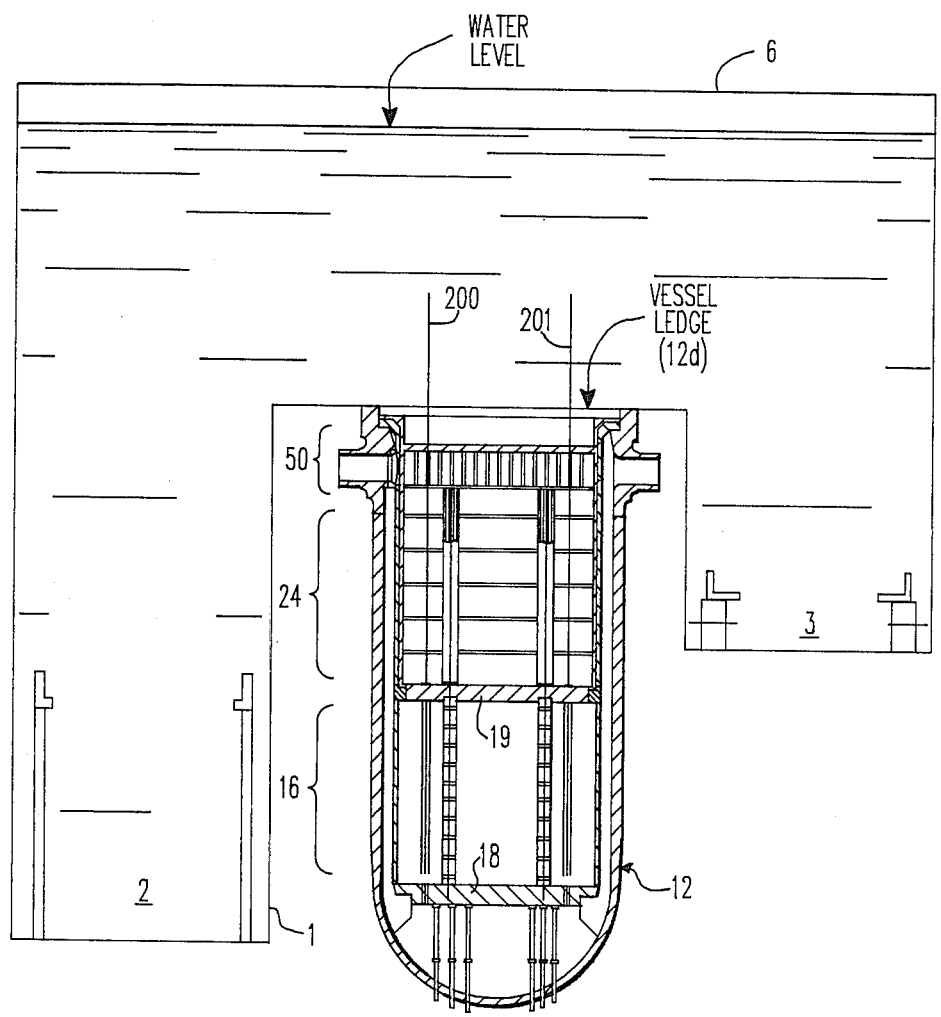
FIGS. 14 through 20 comprise simplified, elevational cross-sectional views of a pressurized water reactor vessel and its major internal components in various stages of disassembly, in conjunction with a containment structure having associated storage stands therein and an internals lifting rig which provides for lifting selected such components from within the vessel and transporting same for positioning in the respective storage stands, for explaining the method of operation and illustrating the benefits of the disconnectable two-piece drive rod assemblies in accordance with the present invention.

The method of the invention, as enabled by the remotely disconnectable and differentiated, or noninterchangeable, drive rod and hub extension components of the CRDM and DRDM drive rod assemblies of the invention will now be explained with references to FIGS. 14 through 20; in each of these figures, the vessel 12 is illustrated as to its internal components in a simplified manner, but is to be understood to correspond to the detailed presentation thereof in FIG. 1. Accordingly, in FIG. 14, the head assembly 12a is removed from the vessel 12, the calandria 50, inner barrel assembly 24 and lower barrel assembly 16 remaining. Schematically illustrated in association with the vessel 12 are standard components of the containment structure 1 of a typical nuclear reactor installation, including a first, upper internals storage stand 2 and a second, lower internals storage stand 3, the structure 1 being able to maintain therein a required level of boron-charged water, as indicated in FIG. 14. The water level typically is at an elevation of approximately 98 feet. A floor 6 is supported a few feet above the water level, as indicated in FIG. 14.

The respective CRDM and DRDM drive rod assemblies 200, 201 project upwardly above the ledge 12d of the vessel 12 in this condition.

Figure 15:
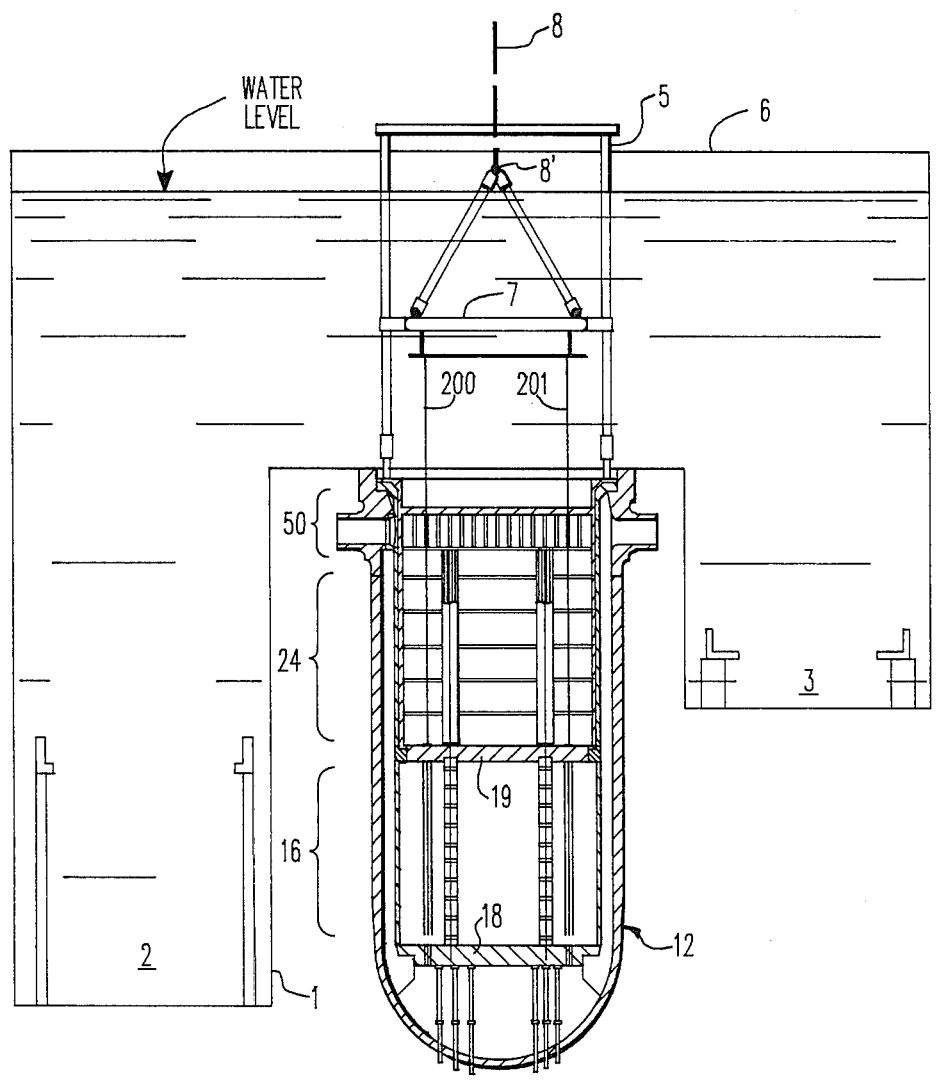

An internals lifting rig 5, supported through a cable support 8 to a derrick or other suitable device, then is moved into position over the vessel 12 and a spreader assembly 7, carried by the lifting rig 5, then is lowered to engage the upper, free ends of the drive rod assemblies 200, 201, in known fashion, as shown in FIG. 15.

Figure 16:
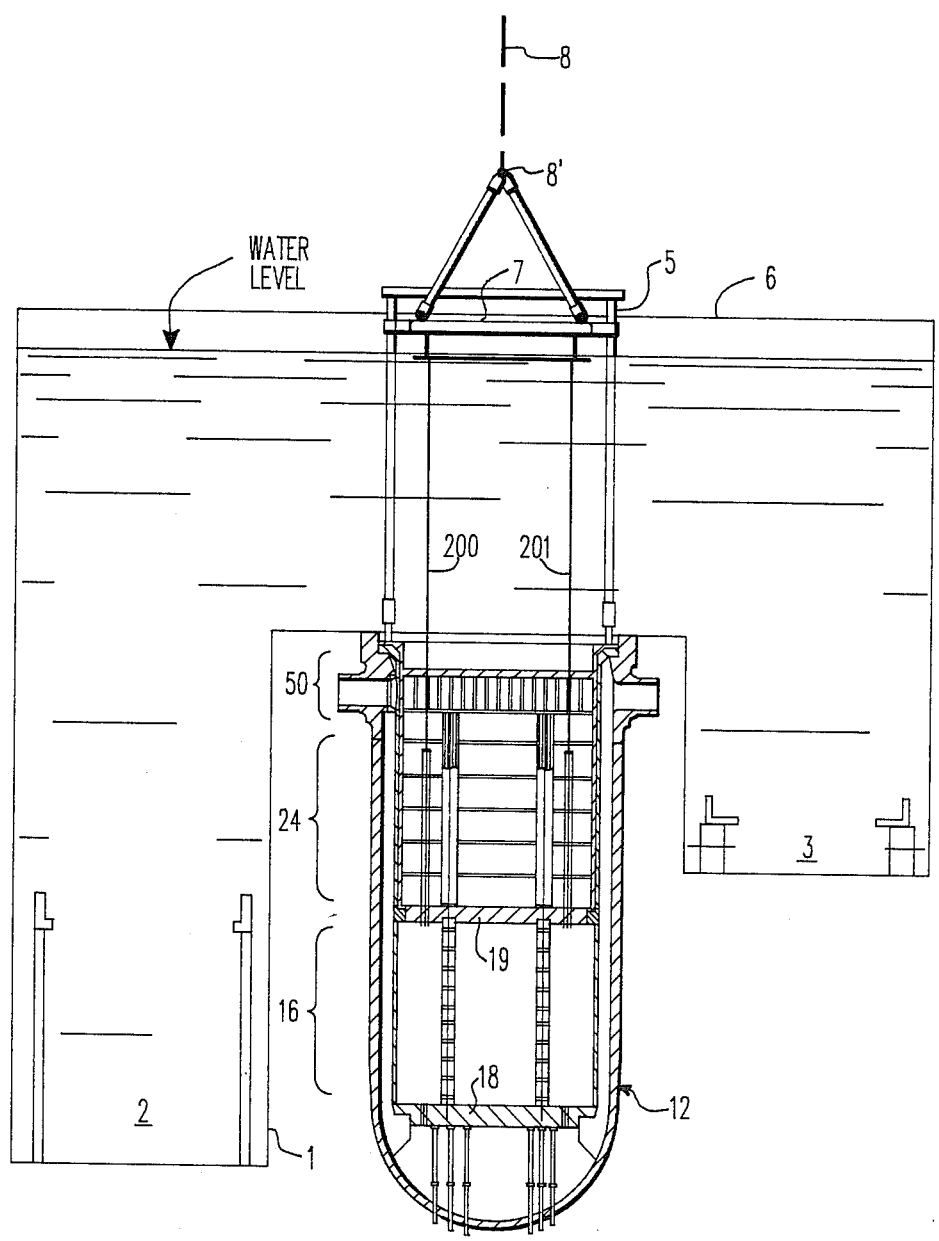

Progressing to FIG. 16, the spreader assembly 7 then is raised, withdrawing the drive rod assemblies 200, 201, to the refueling position "REF" as described with reference to FIGS. 9A and 9B. The upper internals, comprising the calandria 50 and the inner barrel assembly 24 as contained within the cylindrical sidewall 17 and including the upper core plate 18, then are raised as a unitary assembly by the rig 5 so as to clear the ledge 12d of the vessel, the spreader assembly 7 retaining the drive rod assemblies 200 and 201 in the refueling position. In FIG. 16, therefore, the drive rod assemblies 200, 201 extend for the full length of some 34 feet from their connections (at the semipermanent joints) to the spiders immediately beneath the calandria 50, extending therefore several feet above the water level. It is significant that the entirety of this operation can be performed remotely and thus, although the drive rods 200 and 201 are exposed above the water level, no adverse conditions are created. Specifically, release of contaminants into the air is a minimum risk, since the drive rods remain wet, supressing release of any surface contamination, and the movement en masse, of the unitary assembly can be performed rapidly.

Figure 17:
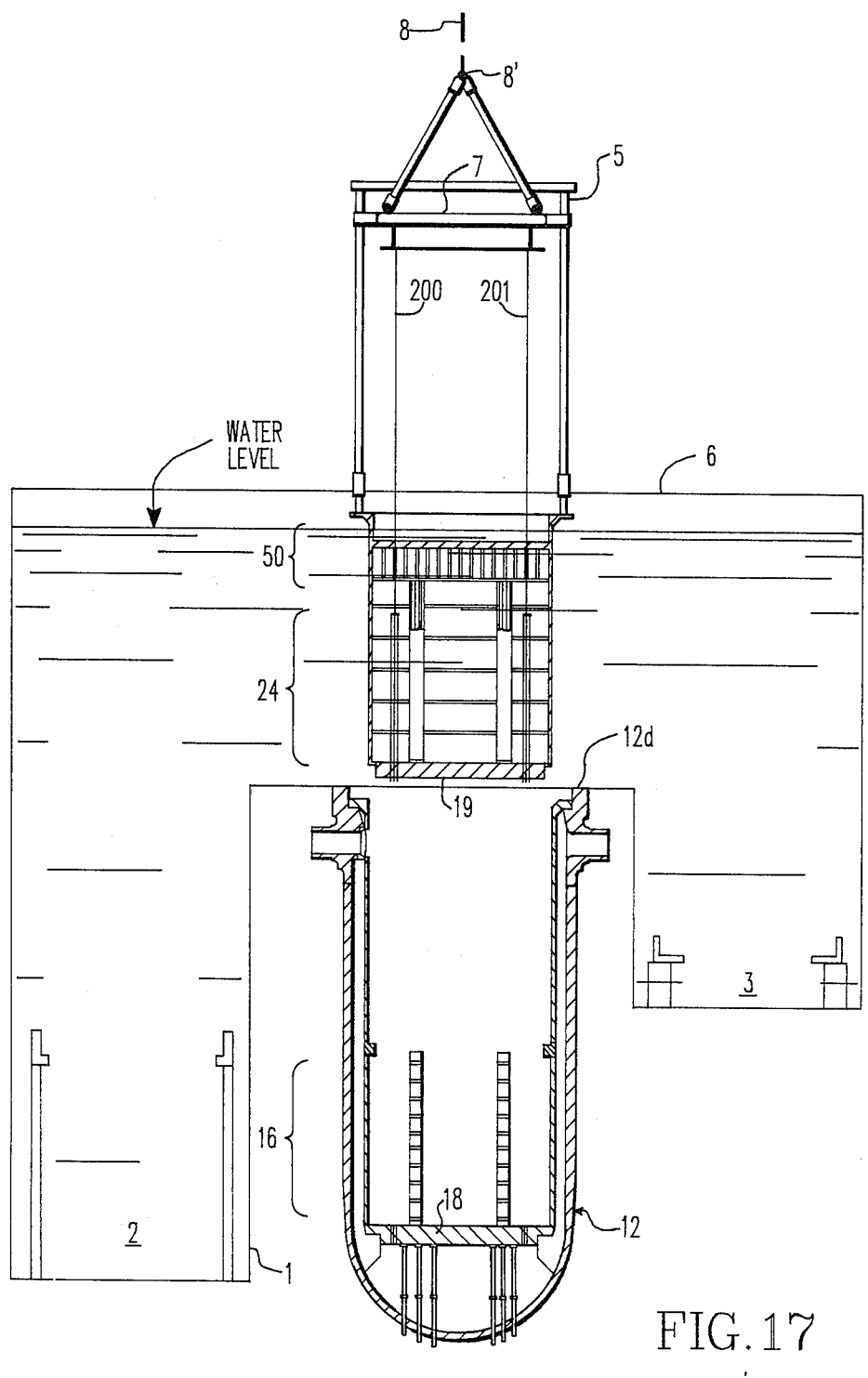
Figure 18:
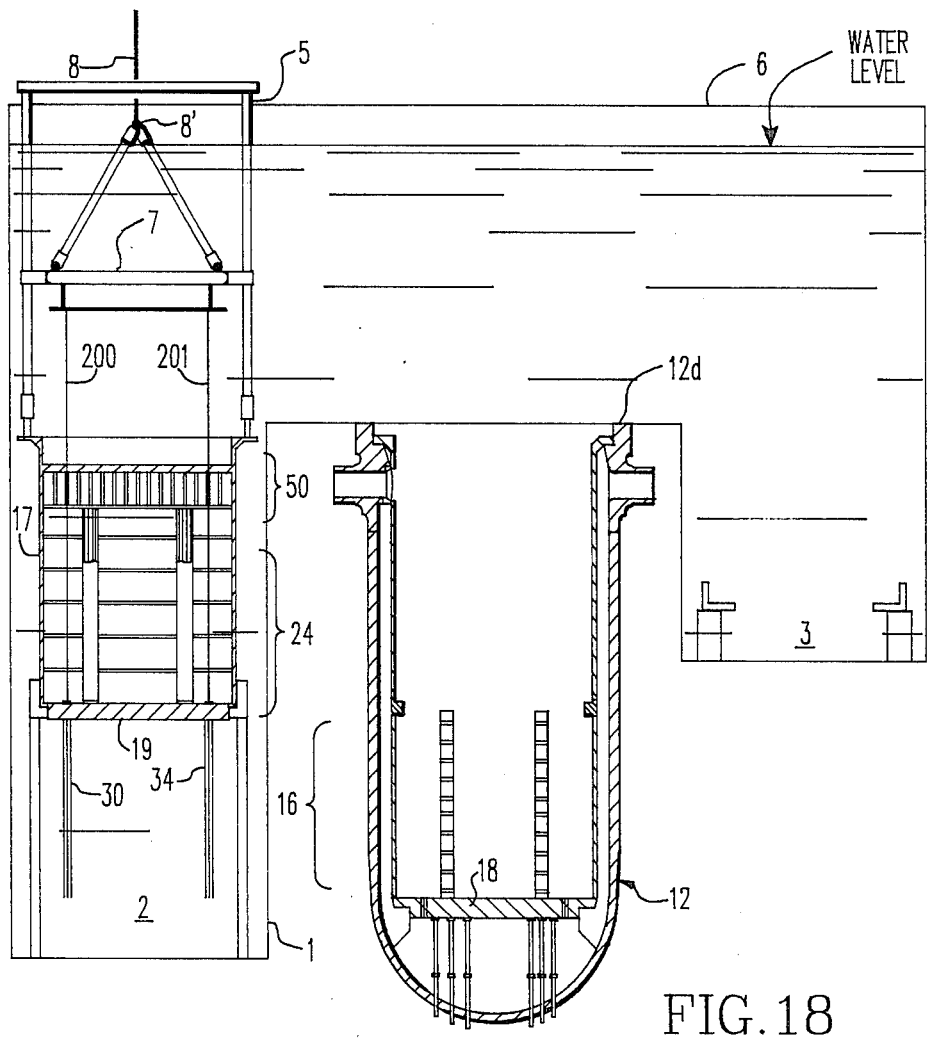

In progressing from FIG. 17 to FIG. 18, the lifting rig 5 transports the raised upper internals over the upper ledge 12d of the vessel 12 and into position over the upper internals storage stand 2. The rig 5 lowers the entire assembly onto the stand 2 and the spreader assembly 7 then is lowered, causing the rod clusters (illustratively indicated by a single RCC cluster 30 and a single WDRC cluster 34) to move downwardly to their fully inserted positions. At this juncture, and measuring elevations with respect to distance below the water level, the upper core plate 18 is at an elevation of approximately 48 feet, leaving a distance of approximately 50 feet to the bottom of the containment structure 1, into which underlying portion the RCC and WDRC rod guides 30, 34 extend. The corresponding spiders 100 and 120 (not shown in FIG. 18, but see FIGS. 9A and 9B) rest on the upper core plate 18 and thus support the RCC and WDRC rod clusters within the corresponding rod guides 30 and 34. The lower calandria plate 52 is some 35 feet below the water level, and the ledge 12d of the vessel 12 is approximately 27 feet beneath the water level. The upper ends of the drive rod assemblies 200, 201 and, correspondingly, the spreader assembly 7, are at an elevation of some 15 feet below the water level. The drive rod assemblies 200, 201 thus are readily accessible by appropriate handling tools for actuation of the disconnect buttons, thereby to release the drive rod portions 206, 207 at the corresponding quick disconnect couplings 208, 209 (which currently are positioned beneath, but closely adjacent the lower calandria plate 52, corresponding to the fully inserted positions of FIG. 9A and 9B, and thus at the approximately 35-foot elevation).

Figure 19:
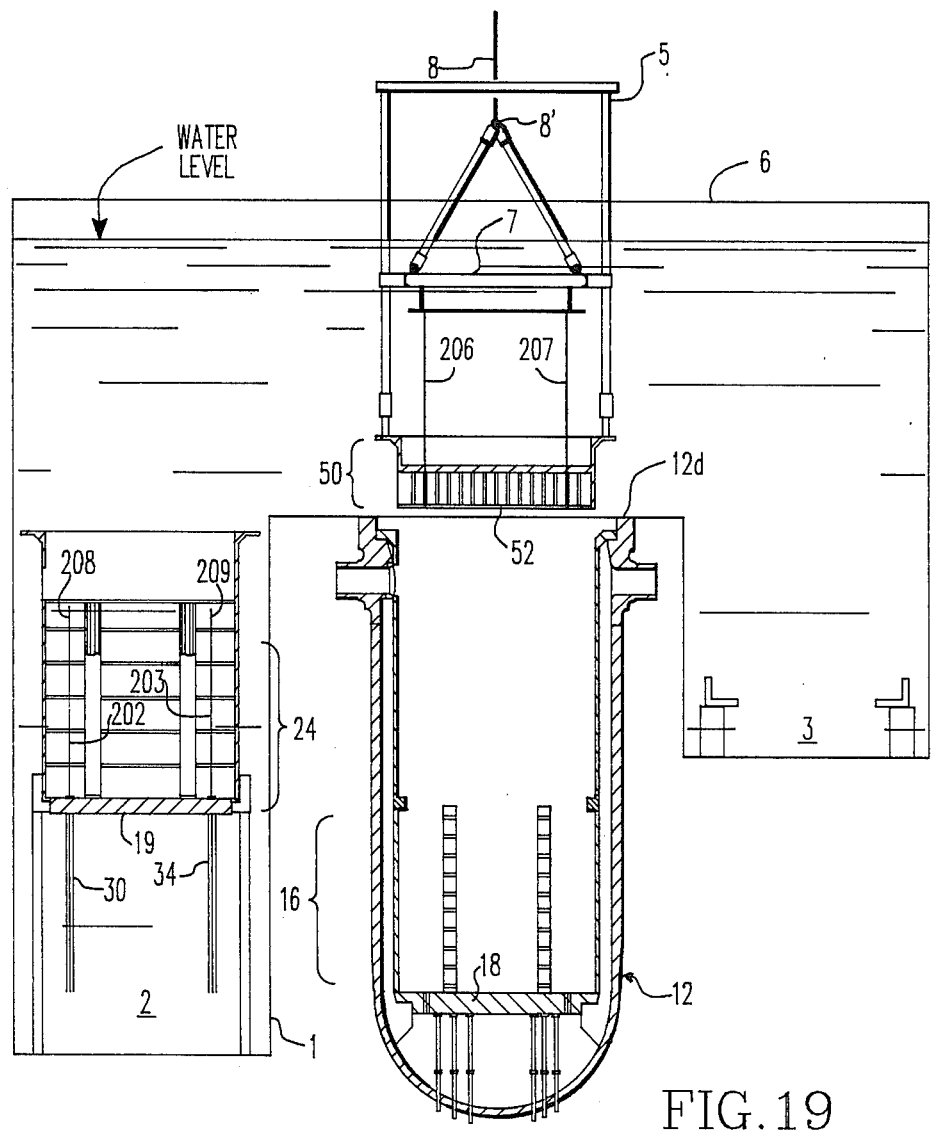
Figure 20:
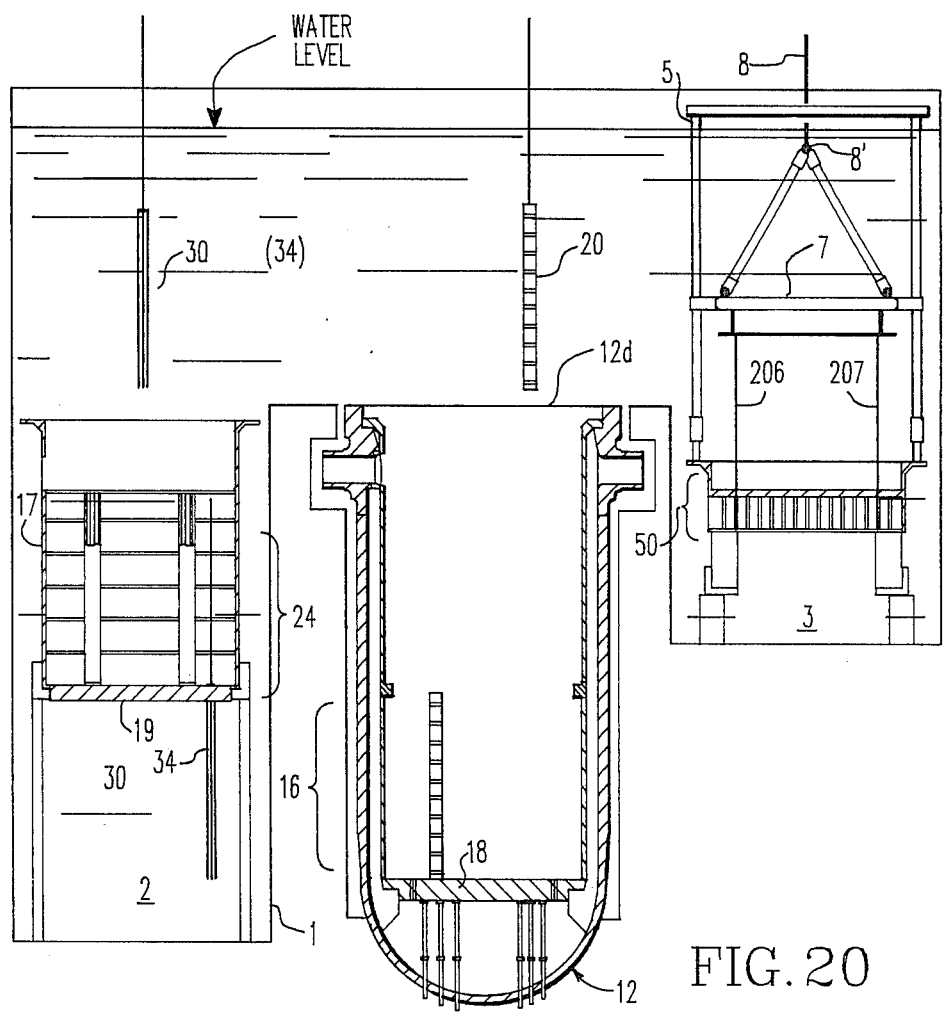

Proceeding to FIG. 19, the rig 5 then raises the calandria 50 vertically while simultaneously raising the spreader assembly 7, to a sufficient elevation to position the lower calandria plate 52 approximately one foot above the ledge 12d of the vessel 12, for transporting same to the lower internals storage stand 3 and, as shown in FIG. 20, then lowers the mass assemblage of the calandria 15 and the drive rod portions 206, 207 onto the support stand 3. As schematically illustrated in FIG. 20, the fuel assemblies 20 and the rod clusters 30, 34 may be withdrawn individually for inspection, repair or the like or, in the case of the fuel assemblies 20, for purposes of relocating same within the core or to perform routine fuel exchange operations.

The drive rod portions 206, 207 may include stops so as to prevent them from falling downwardly through the calandria 50 or alternatively they may be permitted to drop to the bottom of the containment structure 1, while remaining laterally supported by the calandria 50. They as well may be withdrawn for inspection and/or replacement, while the calandria 50 is positioned in stand 3.

For reassembling the reactor vessel, the foregoing steps are repeated in reverse. Significantly, in proceeding from FIG. 20 to a stage just prior to that shown in FIG. 18, because of the provision of the remotely actuated, quick disconnect couplings 208, 209, the drive rod portions 206, 207, which are only some 21 feet in length, remain substantially immersed below the water during the operations of recoupling, or reconnecting, the drive rod portions 206, 207 to the corresponding hub extensions 202, 203 for completing the assemblage as shown in FIG. 18. Significantly, the corresponding quick disconnect couplings 208, 209 are disposed at an elevation of only some 35 feet below the water level, greatly facilitating the coupling operations, while nevertheless assuring adequate protection to personnel involved in performing the reassembly operations. It will now be apparent that the provision of the differentiated, or noninterchangeable configurations of the components of the couplings 208, 209, serves to assure that the CRDM and DRDM drive rod portions 206, 207 cannot be inadvertently attached to the incorrect hub extensions, and instead that they can and will be attached only to the correct CRDM and DRDM hub extensions 202, 203, respectively.

The significant improvement in personnel protection and in cost and simplification of handling the drive rod assemblages 200, 201 of the present invention, relative to prior art structures and techniques, will be even more fully appreciated by way of comparison to the geometries and dimensions which would obtain in performing the operations depicted in FIGS. 14 to 20 if conventional one-piece drive rods were employed in lieu of those of the invention. For example, if unitary, or single-piece drive rods were employed of the requisite 34-foot length, they clearly would extend well above the water level in the assembly operations described with reference to FIGS. 18 and 19, presenting a serious problem of potential atmospheric contamination and thus a hazard to the personnel participating in the reassembly operations. In addition to the far greater difficulty of handling such 34-foot long drive rods, simply due to the sheer, unwieldly length and weight thereof, the assembly operations would require lowering the drive rods through the corresponding calandria tubes within the calandria assembly 50 and then throughout the lengths of the corresponding rod guides within the inner barrel assembly 24, with final connections required to be made at the hubs of the corresponding spiders at rest on the core plate 18, some 48 feet below the water level. Not only is such a circumstance difficult to achieve mechanically, it imposes a serious potential risk of damage to the calandria 50 and the associated rod guides. Further, because of the extremely close spacing of the drive rods in view of the dense packing of the rod clusters and the 48 foot length of such unitary drive rods, misalignment may readily occur, with the possible result of inserting the drive rods through incorrect openings within the calandria, presenting an unacceptable risk of mechanical damage. Accordingly, it is believed clear that the provision of the remotely disconnectable two-piece drive rods and the methods of operation of assembly/disassembly and maintenance afforded thereby, all in accordance with the present invention, solve a potentially serious problem attendant the required maintenance and related operations involving assembly and disassembly of pressure vessels of the subject, advanced design.

Numerous modifications and adaptations of the present invention will be apparent to those of skill in the art and thus it is intended by the appended claims to cover all such modifications and adaptations which fall within the true spirit and scope of the present invention.

We claim as our invention:

1. A system for assembling and disassembling a pressurized water reactor, comprising:
   a pressure vessel having provided therein, at successively higher elevations:
   a lower barrel assembly for receiving plural, elongated fuel rod assemblies therein in parallel axial relationship, each fuel rod assembly having a lower end secured to the lower barrel assembly and an upper, free end,
   an inner barrel assembly, selectively removable from and positionable within the pressure vessel and having a lower support plate disposed adjacent the upper free ends of the fuel rod assemblies when positioned within the pressure vessel, for receiving plural clusters of rods mounted in parallel axial relationship for selectively controlled, axial movement in telescoping relationship with the fuel rod assemblies in a path of travel between a downward direction, fully inserted position of the rod clusters within the lower barrel assembly at which position the rod clusters are supported at their upper ends on the lower support plate against further downward motion and an upward direction, fully withdrawn position of the rod clusters within the inner barrel assembly, and
   a head assembly in sealed communication with the lower and inner barrel assemblies for containing the pressurized reactor coolant fluid within the vessel;
   a plurality of drive means disposed in parallel axial relationship on and extending in sealed relationship through the head assembly; and
   a plurality of drive rod assemblies respectively connected to said plurality of rod clusters and movable axially therewith through a path of travel corresponding to the movement of the respective rod clusters between the fully withdrawn and the fully inserted positions thereof, each said drive means being selectively actuable to release and to engage a respective said drive rod assembly and said drive means being selectively operable to move said respective drive rod assembly and associated rod cluster through the path of travel between the fully inserted and the fully withdrawn positions thereof, each said drive rod assembly comprising a lower, elongated hub extension upper and lower ends, an upper, elongated drive rod portion having lower and upper ends and a selectively disconnectable coupling comprising first and second coupling components respectively mounted on the adjacent ends of the hub and drive rod portions for selectively coupling same together as a unitary drive rod assembly;
   said plural clusters of rods comprising a first plurality of rod clusters of a first type and a second plurality of rod clusters of a second type;
   said plural drive rod assemblies comprising a first plurality of drive rod assemblies of a first type respectively associated with said first plurality of rod clusters of a first type, and a second plurality of drive rod assemblies of a second type respectively associated with said second plurality of rod clusters of the second type;
   said remotely and selectively actuable couplings of said first and second pluralities of drive rod assemblies comprise respective, first and second pluralities of couplings of respective, first and second types, and each of said coupling comprises a pair of first and second selectively disconnectable coupling components respectively mounted on said hub portion and said drive rod portion of the associated drive rod assembly, said components of said coupling means of the first type being noninterchangeable with said components of said coupling means of the second type;
   the drive means being selectively actuable to release the respective drive rod assembly for removal of the head assembly with the drive rod assemblies connected to and supported by the respective rod clusters while the rod clusters are supported at their upper ends on the lower support plate against further downward motion and in the fully inserted positions thereof; and
   means for engaging the inner barrel assembly for upward withdrawal of some from within the pressure vessel and, simultaneously therewith and as a unitary assembly, the plural rod clusters and respectively associated drive rod assemblies.

2. A system for assembling and disassembling a pressurized water reactor as recited in claim 1, wherein there are further provided:
   plural spiders respectively corresponding to said plural clusters of rods, each said spider mounting the rods of the corresponding cluster in parallel axial relationship and having a central hub;
   said support plate having apertures therein corresponding to the rods of each of said plural clusters of rods and receiving the said corresponding rods therethrough for axial movement in the path of travel between the fully inserted and fully withdrawn positions thereof;
   each said spider being supported on said support plate with the associated said cluster of rods in the fully inserted position thereof; and
   each said hub extension being connected at the lower end thereof to a corresponding said spider and being of sufficient axial length, with respect to the fully inserted position of the associated rod cluster, so as to dispose the upper end of the hub extension adjacent said support plate.

3. A system for assembling and disassembling a pressurized water reactor as recited in claim 2, wherein:
   said pressure vessel further comprises a calandria assembly disposed within the pressure vessel and extending in elevation between said inner barrel assembly and said head assembly, said calandria assembly having apertures therein respectively aligned with said drive rod assemblies; and said second portions of said plurality of drive rod assemblies comprise drive rod portions of sufficient axial length to remain in engagement with the respective said drive means and extend through the respective apertures of said calandria assembly for connection by the corresponding said coupling means to the corresponding said hub portions of the associated drive rod assemblies in the fully inserted position of the corresponding rod clusters.

4. A system for assembling and disassembling a presurized water reactor system as recited in claim 3, wherein:
said calandria assembly comprises lower and upper calandria plates connected in parallel relationship and respectively defining the top elevation of the inner barrel assembly and the bottom elevation of the head assembly;
said drive rod assemblies, comprising the respective said drive rod portions, said selectively and remotely disconnectable couplings and said hub extensions thereof, are receivable for axial movement through said respectively corresponding apertures in said calandria assembly for supporting said corresponding spiders adjacent said lower calandria plate and within said inner barrel assembly when the corresponding rod clusters are in the fully withdrawn position.

5. A system for assembling and disassembling a presurized water reactor as recited in claim 4, further comprising:
a plurality of rod guides mounted at the lower ends thereof on said support plate in parallel axial relationship and selectively connectable at the upper ends thereof to said lower calandria plate, and positioned in alignment with and receiving said respectively corresponding rod clusters therewithin for movement throughout the respective paths of travel thereof;
said hub portions of said respective drive rod assemblies are of an axial length corresponding substantially to the length of the respectively associated rod guides and position the respective, selectively and remotely disconnectable coupling means associated therewith adjacent the upper ends of the corresponding said rod guides in the fully inserted position of the respectively associated rod clusters.

6. A system for assembling and disassembling a presurized water reactor as recited in claim 1, wherein:
said pair of first and second selectively disconnectable coupling components of each of said first and second types of said couplings comprises a male component and a female component respectively having keyed exterior and interior surfaces configured for mating interengagement in said coupled condition thereof, said keyed engaging surfaces of said coupling components of said first type being different from the corresponding, keyed engaging surfaces of said coupling components of the second type.

7. A system for assembling and disassembling a presurized water reactor as recited in claim 6, wherein:
said male and female coupling components of said first type are of relatively shorter axial length and said male and female coupling components of said second type are of relatively longer axial length.

8. A system for assembling and disassembling a presurized water reactor as recited in claim 7, wherein:
each male component of said couplings of said first and second types includes a protective sleeve secured thereto and extending in surrounding, spaced coaxial relationship about said keyed exterior surface thereof for at least a portion of the axial length of the keyed exterior surface;
said male coupling component of said second type, of relatively longer axial length, if inserted, incorrectly, into said female coupling component of said first type, of relatively shorter axial length, is precluded from being coupled thereto by the corresponding protective sleeve of said male coupling component of said second type abutting the end of said female coupling component of said first type, and precluding thereby any interengagement of the respective, keyed engaging surfaces thereof, and said male coupling component of said first type, of relatively shorter axial length, if inserted, incorrectly, into said female coupling component of said second type, of relatively longer axial length, is precluded from being coupled thereto by the relative axial displacement of the respective, keyed engaging surfaces thereof preventing said surfaces from becoming aligned and interengaged.

9. A system for assembling and disassembling a presurized water reactor as recited in claim 6, wherein:
said male coupling components of both said first and second types are secured to the lower ends of said drive rod portions of said respective drive rod assemblies of said first and second types; and
said female coupling components of said first and second types are secured to the top ends of said hub portions of said respective drive rod assemblies of said first and second types.

10. A system for assembling and disassembling a presurized water reactor as recited in claim 9, wherein each of said male coupling components secured to said drive rod portions of said drive rod assemblies of said first and second types further comprises:
an end flexure coupling element of generally elongated and cylindrical, hollow configuration;
an elongated disconnect rod extending coaxially through said drive rod portion and having a lower end and an upper end;
engaging means mounted on said lower end of said disconnect rod for being positioned thereby adjacent the end of, and in engagement with, the interior walls of the hollow end flexure coupling element for maintaining said end flexure coupling element in a rigid configuration when positioned therewithin;
biasing means associated with said disconnect rod and producing a biasing force for normally positioning said engagement means within said flexure end; and
means disposed on the upper end of said disconnect rod and selectively engageable from the exterior of said drive rod portion for retracting said disconnect rod against the resilient biasing force of said biasing means to withdraw said engaging means from said engaged position to a disengaged position, to permit said end flexure coupling element to collapse; and
said engaging means being normally positioned by said biasing means and said disconnect rod for maintaining said end flexure coupling element in a rigid configuration when received within the corresponding female coupling element for coupling said drive rod portion to said hub portion of said associated drive rod assembly, and said disconnect rod being retracted to withdraw said engaging means from said engaged position to said disengaged position to permit said end flexure coupling element to collapse, for selectively and remotely disconnecting and connecting said drive rod portion from said hub portion of said associated drive rod assembly.

11. A system for assembling and disassembling a pressurized water reactor as recited in claim 6, further comprising:
   semipermanent joints of first and second types respectively connecting said hub portions of said drive rod assemblies of said respective first and second types to said spiders respectively associated with said pluralities of rod clusters of said first and second types.

12. A system for assembling and disassembling a pressurized water reactor as recited in claim 11, wherein each of said semipermanent joints comprises:
   a male, threaded joint element connected to said hub extension and a female, interiorally threaded joint element associated with the corresponding hub portion, said male and female threaded joint elements being threadingly engaged to secure same together; and
   eans for preventing disengagement of said engaged male and female threaded joint elements.

13. A system for assembling and disassembling a pressurized water reactor as recited in claim 12, wherein:
   said male joint elements of said first and second types have corresponding elongated shanks, the shanks of the first type of male joint element being of shorter axial length and larger diameter than the shanks of said male joint elements of the second type; and
   said female joint elements of the first and second types define corresponding interior recesses, the recesses of the first type of female joint element being of smaller axial length and greater diameter than the recesses of said female joint elements of the second type, for rendering the respective male and female joint elements of said respective first and second types noninterchangeable therewith.

14. A method of assembling a pressure vessel of a pressurized water reactor system within a containment structure therefor having a level of boron-charged water therein covering the vessel, the vessel having provided therein, at successively higher elevations, a lower barrel assembly for receiving plural fuel rod assemblies therein in parallel axial relationship, an inner barrel assembly, including a lower support plate, for receiving plural clusters of rods, mounted at the upper ends thereof to corresponding, plural mounting means in parallel axial relationship, for selectively controlled, axial movement in telescoping relationship with the fuel rod assemblies between a downward direction, fully inserted position within the lower barrel assembly at which position the rod clusters are supported by the respective mounting means on the lower support plate against further downward motion and an upward direction, fully withdrawn position within the inner barrel assembly, the inner barrel assembly having a support plate defining the lower elevation thereof and having a plurality of apertures therethrough corresponding to the plural clusters of rods and receiving same for axial movement therethrough, a calandria assembly disposed above the inner barrel assembly and having a lower calandria plate defining the upper elevation of the inner barrel assembly and an upper calandria plate connected in parallel relation to the lower calandria plate, the upper and lower calandria plates having aligned apertures therein respectively corresponding to and aligned with said plural clusters of rods, a head assembly in sealed communication with the calandria and the lower and inner barrel assemblies for containing pressurized reactor coolant fluid within the vessel, and a plurality of drive means disposed in parallel axial relationship on and extending in sealed relationship through the head assembly and in alignment with the aligned apertures in the upper and lower calandria plates and respectively associated with the plurality of rod clusters, comprising:
   providing a plurality of drive rod assemblies respectively corresponding to the plurality of rod clusters and each comprising a lower, elongated hub portion, an upper, elongated drive rod portion and a selectively disconnectable coupling comprising first and second coupling components mounted on the adjacent ends of the respective hub and drive rod portions for selectively coupling same together as a unitary drive rod assembly, said plural clusters of rods comprising a first plurality of rod clusters of a first type and a second plurality of rod clusters of a second type; said plural drive rod assemblies comprising a first plurality of drive rod assemblies of a first type respectively associated with said first plurality of rod clusters of a first type, and a second plurality of drive rod assemblies of a second type respectively associated with said second plurality of rod clusters of the second type, and said remotely and selectively actuable couplings of said first and second pluralities of drive rod assemblies comprising respective, first and second pluralities of couplings of respective, first and second types; each said coupling furthermore comprising a pair of first and second selectively disconnectable coupling components respectively mounted on said hub portion and said drive rod portion of the associated drive rod assembly, said components of said coupling means pof the first type being noninterchangeable with said components of said coupling means of the second type;
   supporting said inner barrel assembly with said hub portion of said plural drive rod assemblies connected to respective mounting means of the corresponding rod clusters and with the respective mounting means disposed on the support plate, with the rod clusters inserted through the corresponding apertures in the support plate and extending therefrom in the fully inserted position thereof, relative to said support plate, the hub portions of said corresponding drive rod assemblies thereby being supported in parallel axial relationship within the inner barrel assembly;
   inserting the drive rod portions of the plurality of drive rod assemblies through the corresponding apertures provided therefor in the upper and lower calandria plates and positioning the calandria assembly with the drive rod portions aligned with the respectively corresponding hub portions of the associated drive rod assemblies; and
   selectively actuating each pair of first and second coupling components for coupling together the associated drive rod portion with the respectively corresponding hub portion as a unitary drive rod assembly, for each of said plurality of drive rod assemblies.

15. A method as recited in claim 14, further comprising:

performing each of the supporting, inserting, and selective connecting steps while maintaining the drive rod portions and related assemblages beneath the level of the boron-charged water.

16. A method as recited in claim 15, further comprising:

engaging said plurality of drive rod assemblies adjacent the upper end of said drive rod portions thereof and raising same, substantially simultaneously, to move said associated rod clusters to the fully withdrawn positions thereof; and transporting the assemblages of said inner barrel assembly, as assembled with said calandria and with said drive rod assemblies in said raised positions and said corresponding rod clusters correspondingly in said fully withdrawn positions, into alignment over said vessel, and lowering said assemblage into said vessel with said rod clusters in predetermined, aligned positions for telescoping relationship with said respective fuel rod assemblies and simultaneously lowering said drive rods for moving said corresponding rod clusters through said path of travel thereof into the fully inserted positions thereof.

17. A method as recited in claim 16, further comprising:

assembling the head assembly with the assembled calandria and inner barrel assembly disposed within the vessel, including aligning the drive rod portions of the respective plural drive rod assemblies with the corresponding plural drive means so as to be engaged thereby.

18. A method for disassembling the pressure vessel, assembled as recited in claim 17, further comprising:

removing the head assembly;

engaging the drive rod portions of the drive rod assemblies and moving same, substantially simultaneously, for raising the respectively corresponding rod clusters to a fully withdrawn position and supporting the drive rod portions for maintaining the respectively corresponding rod clusters in the fully withdrawn position, relative to the inner barrel assembly;

raising the assemblage of the calandria assembly and the inner barrel assembly, while maintaining the drive rod assemblies in a fixed position relative thereto with the rod clusters in the fully withdrawn position, for removing same simultaneously from the vessel, and transporting the raised and removed assemblage to a storage stand within the containment structure, removed from the vessel, and supporting same on the storage stand; and lowering the drive rod assemblies to dispose the corresponding rod clusters in the fully inserted position, supported by the respective mounting means on the support plate of the inner barrel assembly.

19. A method as recited in claim 18, further comprising:

selectively actuating the couplings of said plurality of said drive rod assemblies, in sequence, for successively disconnecting the drive rod portions of the plural drive rod assemblies, while maintaining engagement thereof; and raising the calandria assembly for withdrawing same from said inner barrel assembly while simultaneously raising the disconnected drive rod portions for common translation therewith and transporting same into position over a second storage stand within the containment structure; and lowering the calandria assembly onto the second storage stand.

20. A method as recited in claim 19, further comprising:

performing the steps of selective actuating, raising, transporting and lowering the calandria assembly beneath the level of the boron-charged water.

21. A method of disassembling a pressure vessel of a pressurized water reactor system within a containment structure therefor having a level of boron-charged water therein covering the vessel, the vessel having provided therein, at successively higher elevations, a lower barrel assembly for receiving plural fuel rod assemblies therein in parallel axial relationship, an inner barrel assembly, including a lower support plate, for receiving plural clusters of rods, mounted at the upper ends thereof to corresponding, plural mounting means in parallel axial relationship, for selectively controlled, axial movement in telescoping relationship with the fuel rod assemblies between a downward direction, fully inserted position within the lower barrel assembly at which position the rod clusters are supported by the respective mounting means on the lower support plate against further downward motion and an upward direction, fully withdrawn position within the inner barrel assembly, the inner barrel assembly support plate defining the lower elevation thereof and having a plurality of apertures therethrough corresponding to the plural clusters of rods and receiving same for axial movement therethrough, a calandria assembly disposed above the inner barrel assembly and having a lower calandria plate defining the upper elevation of the inner barrel assembly and an upper calandria plate connected in parallel relation to the lower calandria plate, the upper and lower calandria plates having aligned apertures therein respectively corresponding to and aligned with said plural clusters of rods, a head assembly in sealed communication with the calandria and the lower and inner barrel assemblies for containing pressurized reactor coolant fluid within the vessel, and a plurality of drive means disposed in parallel axial relationship on and extending in sealed relationship through the head assembly and in alignment with the aligned apertures of the upper and lower calandria plates and respectively associated with the plurality of rod clusters, comprising:

providing a plurality of drive rod assemblies respectively corresponding to the plurality of rod clusters and each comprising a lower, elongated hub portion, an upper, elongated drive rod portion and a selectively disconnectable coupling comprising first and second coupling components mounted on the adjacent ends of the respective hub and drive rod portions for selectively coupling same together as a unitary drive rod assembly and wherein said plural clusters of rods comprise a first plurality of rod clusters of a first type and a second plurality of rod clusters of a second type, said plural drive rod assemblies comprise a first plurality of drive rod assemblies of a first type respectively associated with said first plurality of rod clusters of a first type, and a second plurality of drive rod assemblies of a second type respectively associated with said second plurality of rod clusters of the second type, and said remotely and selectively actuable couplings of said first and second pluralities of drive rod assemblies comprise respective, first and second pluralities of couplings of respective, first and second types, and each said coupling comprises a pair of first and second selectively disconnectable coupling components respectively mounted to said hub portion and said drive rod portion of the associated drive rod assembly, said components of said coupling means of the first type bring noninterchangeable with said components of said coupling means of the second type;

removing the head assembly;

engaging the drive rod portions of the drive rod assemblies while maintaining the hub portions coupled thereto as unitary drive rod assemblies and moving same, substantially simultaneously, for raising the respectively corresponding rod clusters to a fully withdrawn position and supporting the drive rod portions relatively to the inner barrel assembly for maintaining the respectively corresponding rod blusters in the fully withdrawn position;

raising the assemblage of the calandria assembly and the inner barrel assembly, while maintaining the drive rod assemblies in a fixed position relative thereto and with the rod clusters in the fully withdrawn position, for removing same simultaneously from the vessel, and transporting the raised and removed assemblage to a storage stand within the containment structure, removed from the vessel, and supporting same on the storage stand; and lowering the drive rod assemblies to dispose the corresponding rod clusters in the fully inserted position, supported by the respective mounting means on the support plate of the inner barrel assembly.

22. A method as recited in claim 21, further comprising:

selectively actuating the couplings of said plurality of said drive rod assemblies, for successively disconnecting the drive rod portions of the plural drive rod assemblies from the respectively associated hub portions, while maintaining engagement of the drive rod portions; and raising the calandria assembly for withdrawing same from said inner barrel assembly while simultaneously raising the disconnected drive rod portions for common translation therewith and transporting same into position over a second storage stand within the containment structure; and lowering the calandria assembly onto the second storage stand.

23. A method as recited in claim 22, further comprising:

performing the steps of selective actuating, raising, transporting and lowering the calandria assembly beneath the level of the boron-charged water.

24. A method of selectively assembling and disassembling a pressure vessel for a pressurized water reactor system, the pressure vessel having as components, to be assembled therein at successively higher elevations:

a lower barrel assembly for receiving plural fuel rod assemblies therein in parallel axial relationship, an inner barrel assembly for receiving and mounting in parallel axial relationship therein plural clusters of rods, the inner barrel assembly to be assembled with the lower barrel assembly with the plural clusters of rods aligned with respective fuel rod assemblies for selectively controlled, axial movement of the plural clusters of rods in telescoping relationship with the fuel rod assemblies in a path of travel between a fully inserted position of the rod clusters within the lower barrel assembly when the inner barrel assembly is assembled with the lower barrel assembly, and a fully withdrawn position of the rod clusters within the inner barrel assembly, a head assembly to be assembled in sealed communication with the lower and inner barrel assemblies for containing the pressurized reactor coolant fluid within the vessel, and a plurality of drive means disposed in parallel axial relationship on and extending in sealed relationship through the head assembly, the method comprising:

Step A: providing a plurality of drive rod assemblies respectively associated with said plural clusters of rods, each drive rod assembly comprising a lower, elongated hub portion, an upper, elongated drive rod portion and a selectively disconnectable coupling and wherein said plural clusters of rods comprise a first plurality of rod clusters of a first type and a second plurality of rod clusters of a second type, said plural drive rod assemblies comprise a first plurality of drive rod assemblies of a first type respectively associated with said first plurality of rod clusters of a first type, and a second plurality of drive rod assemblies of a second type respectively associated with said second plurality of rod clusters of the second type, said remotely and selectively actuable couplings of said first and second pluralities of drive rod assemblies comprise respective, first and second pluralities of couplings of respective, first and second types, and each said coupling comprises a pair of first and second selectively disconnectable coupling components respectively mounted to said hub portion and said drive rod portion of the associated drive rod assembly, said components of said coupling means of the first type being noninterchangeable with said components of said coupling means of the second type, each said coupling being remotely and selectively actuable to connect said first and second elongated hub and drive rod portions as a unitary drive rod assembly, and to disconnect said hub and drive rod portions, the first elongated portion of each drive rod assembly being engagable by corresponding drive means and each said drive means being selectively operable to move the engaged, elongated drive rod portion of the associated drive rod assembly, and, when joined thereto, the respective elongated hub portion and associated rod cluster, through a path of travel corresponding to the movement of the respective rod cluster between the fully withdrawn and the fully inserted positions thereof;

Step B: selectively, positioning and securing the head assembly in sealed communication with, or releasing and removing the head assembly from sealed communication with, the inner and lower barrel assemblies in assembling or in disassembling, respectively, the components of the vessel;

Step C: selectively, engaging or disengaging said drive means and said respective, elongated drive rod portions of the associated drive rod assemblies, in assembling or in disassembling, respectively, the components of the vessel;

Step D: supporting the drive rod assemblies, when disengaged from respective drive means, by said inner barrel assembly with the corresponding rod clusters in the fully inserted positions of the paths of travel thereof;

Step E: selectively, engaging and moving the elongated drive rod portions of said plural drive rod assemblies, when disconnected from the associated, elongated hub portions thereof, into position within the inner barrel assembly in alignment with the respective elongated hub portions and proximate thereto, or engaging and withdrawing the elongated drive rod portions from the positions proximate to and aligned with the respective elongated hub portions, in assembling or in disassembling, respectively, the components of the vessel; and Step F: selectively, remotely actuating said couplings of said drive rod assemblies, to connect the aligned, proximately positioned and disconnected, respective elongated drive rod and hub portions of said drive rod assemblies, or to disconnect said joined, respective elongated drive rod and hub portions of each drive rod assembly, in assembling or in disassembling, respectively, the components of the vessel.

25. The method as recited in claim 24, wherein the Steps B through F are selectively performed for assembling the components of the vessel in the sequence of Step F through Step B.

26. The method as recited in claim 24, wherein Steps B through F are selectively performed for disassembling the components of the vessel in the sequence of Step B through Step F.

* * * * *